(12) United States Patent
Mizutani

(10) Patent No.: US 11,240,439 B2
(45) Date of Patent: Feb. 1, 2022

(54) ELECTRONIC APPARATUS AND IMAGE CAPTURE APPARATUS CAPABLE OF DETECTING HALATION, METHOD OF CONTROLLING ELECTRONIC APPARATUS, METHOD OF CONTROLLING IMAGE CAPTURE APPARATUS, AND STORAGE MEDIUM

(71) Applicant: CANON KABUSHIKI KAISHA, Tokyo (JP)

(72) Inventor: Junya Mizutani, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 16/708,992

(22) Filed: Dec. 10, 2019

(65) Prior Publication Data

US 2020/0204716 A1 Jun. 25, 2020

(30) Foreign Application Priority Data

Dec. 20, 2018 (JP) .............................. JP2018-238628
Dec. 20, 2018 (JP) .............................. JP2018-238629

(51) Int. Cl.
*H04N 5/235* (2006.01)
*H04N 5/243* (2006.01)
*H04N 5/33* (2006.01)

(52) U.S. Cl.
CPC ......... *H04N 5/2351* (2013.01); *H04N 5/2353* (2013.01); *H04N 5/243* (2013.01); *H04N 5/33* (2013.01)

(58) Field of Classification Search
CPC .... H04N 5/2351; H04N 5/2353; H04N 5/243; H04N 5/33; G06K 9/4661; G06K 9/20
See application file for complete search history.

(56) References Cited

U.S. PATENT DOCUMENTS

2002/0024609 A1\* 2/2002 Matsushima ........ H04N 1/4074
348/362
2003/0002736 A1\* 1/2003 Maruoka ................... G06T 5/40
382/168

(Continued)

FOREIGN PATENT DOCUMENTS

JP 2004072415 A 3/2004
JP 2016220002 A 12/2016

OTHER PUBLICATIONS

Extended European Search Report issued in European Application No. 19217578.4 dated Apr. 17, 2020.

*Primary Examiner* — Timothy J Henn
(74) *Attorney, Agent, or Firm* — Rossi, Kimms & McDowell LLP

(57) ABSTRACT

An electronic apparatus that can enhance the accuracy of detection of halation by taking into account the influence of halation on visibility of an object, and also effectively suppress the influence of halation independently of the type of a light source. An evaluation unit evaluates the luminance of the object based on an exposure level at which image data of the object is acquired. A detection unit detects t halation based on the luminance of the object, a first luminance area having a higher luminance than a first luminance threshold value, and a distribution status of another luminance area which is an area having a lower luminance than the first luminance area and is distributed around the first luminance area.

25 Claims, 13 Drawing Sheets

(56) References Cited

U.S. PATENT DOCUMENTS

| | | | |
|---|---|---|---|
| 2007/0076975 A1* | 4/2007 | Abe | H04N 5/243 |
| | | | 382/274 |
| 2007/0285574 A1* | 12/2007 | Nobori | H04N 9/3179 |
| | | | 348/581 |
| 2008/0012942 A1 | 1/2008 | Kawamura | |
| 2010/0079612 A1 | 4/2010 | Kimura | |
| 2013/0051680 A1* | 2/2013 | Kono | G06T 7/11 |
| | | | 382/195 |
| 2018/0167594 A1* | 6/2018 | Osawa | H04N 5/23219 |
| 2019/0012868 A1* | 1/2019 | Okada | B42D 25/36 |

* cited by examiner

ELECTRONIC APPARATUS AND IMAGE CAPTURE APPARATUS CAPABLE OF DETECTING HALATION, METHOD OF CONTROLLING ELECTRONIC APPARATUS, METHOD OF CONTROLLING IMAGE CAPTURE APPARATUS, AND STORAGE MEDIUM

BACKGROUND OF THE INVENTION

Field of the Invention

The present invention relates to an electronic apparatus that detects halation, a method of controlling the electronic apparatus, an image capture apparatus and an electronic apparatus that perform control for suppressing the influence of halation, a method of controlling the image capture apparatus, and a storage medium.

Description of the Related Art

In a case where an object is photographed with a camera under a low-illuminance (low-luminance) environment, when high-illuminance light enters the camera, there occurs a phenomenon of halation in which the object is photographed in a state in which light leaks around the photographing position of the source of the high-illuminance light. The halation occurs when high-luminance incident light forms an image on an image capture device, causing excessive electrical charges to be generated on the image capture device and propagate to surrounding pixels. An image with halation has a problem of degradation of its image quality, such as reduced visibility of the object. For example, in a case where an object is photographed at night with a camera for public road surveillance, halation sometimes occurs in a captured image. At night, the headlights of a vehicle are on, so that a large contrast is generated between ambient light around the headlights and the light of the headlights. If an object is photographed in this state, an image with halation around the headlights of the vehicle is obtained. In the image with halation, the visibility of the appearance, license plate number, etc. of the vehicle is reduced.

As the related art, there has been proposed a technique in which when halation occurs, an incident light amount is reduced using an electronic shutter generally provided in a CCD camera (see e.g. Japanese Laid-Open Patent Publication (Kokai) No. 2004-072415). Japanese Laid-Open Patent Publication (Kokai) No. 2004-072415 also discloses that light amount adjusting means formed by a liquid crystal panel is provided forward of a lens of the camera, for masking excessive incident light, whereby the light amount is adjusted.

For example, in Japanese Laid-Open Patent Publication (Kokai) No. 2004-072415, to eliminate the influence of halation, the incident light amount is reduced by changing the speed of the electronic shutter to a high-speed value. Alternatively, to eliminate the influence of halation, it is also possible to reduce the incident light amount by providing the liquid crystal panel forward of the lens of the camera. Here, even when halation has occurred in an image obtained by photographing with the camera, there is a case where the influence of halation on the visibility of the image is small. For example, even when halation caused by vehicle headlights has occurred in the image, there is a case where the influence of halation on the visibility of a vehicle license plate is small.

On the other hand, in an image obtained by reducing the incident light amount by controlling the electronic shutter or providing the liquid crystal panel, image quality of the image is degraded due to decrease in the incident light amount. Therefore, when the incident light amount is reduced with a view to eliminate the influence of halation, the image quality of the image is degraded although the influence of halation on the visibility of the object is low.

As the related art, there has been also proposed a technique for controlling insertion/removal of an infrared cut filter and a visible light cut filter (see e.g. Japanese Laid-Open Patent Publication (Kokai) No. 2016-220002).

For example, halogen lights that emit light containing a large amount of light in an infrared wavelength range are often used as vehicle headlights. In a case where halogen light is used as a light source, even when the infrared cut filter is inserted into an optical path of the camera, the light containing a large amount of the light in the infrared wavelength range enters the camera. For this reason, in the above-described situation, it is difficult even for the technique proposed in Japanese Laid-Open Patent Publication (Kokai) No. 2016-220002 to suppress the influence of halation on an image that is obtained by photographing an object with the camera.

SUMMARY OF THE INVENTION

The present invention provides an electronic apparatus and an image capture apparatus that are enhanced in the accuracy of detection of halation by taking into account the influence of halation on the visibility of an object, and methods of controlling the electronic apparatus and the image capture apparatus.

The present invention provides an electronic apparatus and an image capture apparatus that effectively suppresses the influence of halation independently of a type of a light source.

In a first aspect of the present invention, there is provided an electronic apparatus including at least one processor or circuit configured to perform the operations of the following units: an evaluation unit configured to evaluate a luminance of an object based on an exposure level at which image data of the object is acquired, and a detection unit configured to detect halation based on the luminance of the object, a first luminance area having a higher luminance than a first luminance threshold value, and a distribution status of another luminance area which is an area having a lower luminance than the first luminance area and is distributed around the first luminance area.

In a second aspect of the present invention, there is provided an electronic apparatus that performs communication with an image capture apparatus including an image capture device which receives incident light containing infrared wavelength light, the electronic apparatus including at least one processor or circuit configured to perform the operation of a control unit configured to perform, in a case where halation having occurred in image data is detected based on luminance information of the image data obtained from the image capture device, control for increasing an irradiation light amount of infrared light irradiated onto an object.

In a third aspect of the present invention, there is provided an image capture apparatus including an image capture device that receives incident light containing infrared wavelength light, and at least one processor or circuit configured to perform the operation of a control unit configured to perform, in a case where halation having occurred in image data is detected based on luminance information of the image data obtained from the image capture device, control for increasing an irradiation light amount of infrared light irradiated onto the object.

In a fourth aspect of the present invention, there is provided a method of controlling an electronic apparatus, comprising evaluating a luminance of an object based on an exposure level at which image data of the object is acquired, and detecting halation based on the luminance of the object, a first luminance area having a higher luminance than a first luminance threshold value, and a distribution status of another luminance area which is an area having a lower luminance than the first luminance area and is distributed around the first luminance area.

In a fifth aspect of the present invention, there is provided a method of controlling an image capture apparatus including an image capture device that receives incident light containing infrared wavelength light, the method comprising performing, in a case where halation having occurred in image data is detected based on luminance information of the image data obtained from the image capture device, control for increasing an irradiation light amount of infrared light irradiated onto an object.

In a sixth aspect of the present invention, there is provided a non-transitory computer-readable storage medium storing a computer-executable program for executing a method of controlling an electronic apparatus, wherein the method comprises evaluating a luminance of an object based on an exposure level at which image data of the object is acquired, and detecting halation based on the luminance of the object, a first luminance area having a higher luminance than a first luminance threshold value, and a distribution status of another luminance area which is an area having a lower luminance than the first luminance area and is distributed around the first luminance area.

In a seventh aspect of the present invention, there is provided a non-transitory computer-readable storage medium storing a computer-executable program for executing a method of controlling an image capture apparatus including an image capture device that receives incident light containing infrared wavelength light, wherein the method comprises performing, in a case where halation having occurred in image data is detected based on luminance information of the image data obtained from the image capture device, control for increasing an irradiation light amount of infrared light irradiated onto an object.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. The component elements in the following embodiments are described only by way of example, and are by no means intended to limit the scope of the present invention to them alone.

Figure 1:
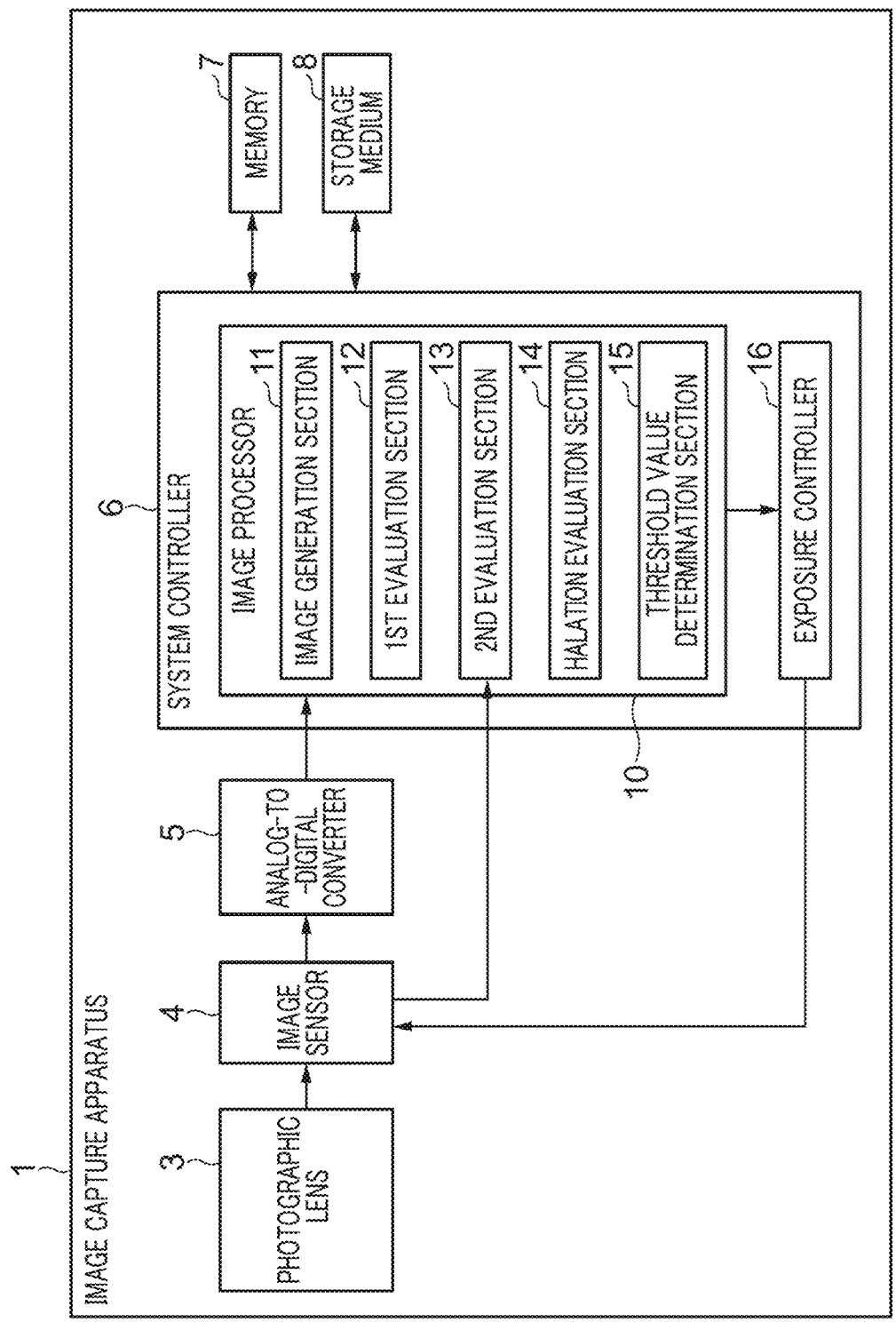
FIG. 1 is a block diagram of an image capture apparatus according to a first embodiment of the present invention.

FIG. 1 is a block diagram of an image capture apparatus 1 according to a first embodiment of the present invention. The image capture apparatus 1 is comprised of a photographic lens 3, an image sensor 4, an analog-to-digital converter 5, a system controller 6, a memory 7, and a storage medium 8. The following description will be given assuming that the image capture apparatus 1 is applied to a camera for public road surveillance. The image capture apparatus 1 may be a public road surveillance camera for unattended operation. However, the image capture apparatus 1 may be used for a purpose other than the public road surveillance. Further, although the description is given assuming that the image capture apparatus 1 performs moving image photographing, the image capture apparatus 1 may perform still image photographing. The image capture apparatus 1 detects halation which affects object visibility. The object is assumed to be a vehicle license plate, a vehicle's appearance or the like. For example, in a case where the image capture apparatus 1 performs public road surveillance under a low illuminance environment e.g. at night, halation sometimes occurs in an image captured by the image capture apparatus 1 by vehicle headlights. However, even when halation has occurred in an image, there is a case where a degree of the influence of halation is small. In this case, it is sometimes possible to visually determine a vehicle license plate number or the like as an object, from the image with halation. Therefore, in the following embodiments, halation is detected by taking into account the influence of halation on the object visibility.

The image capture apparatus 1 includes the photographic lens 3 which represents an optical lens group as an image capture optical system for capturing an optical image of an object. The image sensor 4 receives incident light having passed through the image capture optical system. The image sensor 4 photoelectrically converts the received incident light and forms an object image as an optical image. The image sensor 4 outputs analog electrical signals (analog captured image signals) generated by photoelectrically converting the optical image, to the analog-to-digital converter 5. The analog-to-digital converter 5 converts the analog electrical signals to digital signals (digital captured image signals), and outputs the digital signals to the system controller 6. The system controller 6 includes an image processor 10 and an exposure controller 16. The image processor 10 performs various image processing processes on the digital captured image signals input to the system controller 6 to generate image data. Thus, image data is acquired. The exposure controller 16 determines the brightness of the image data generated by an image generation section 11 of the image processor 10, and controls one of an electronic shutter, an aperture, and a gain of the image sensor 4. This corrects the brightness of the image data.

The photographic lens 3 is assumed to include a magnification lens that moves in an optical axis direction to change the focal length, and a focus lens that moves in the optical axis direction to perform focusing. The image sensor 4 uses a solid-state image capture device (CCD). The image capture apparatus 1 can be applied to a color camera or a monochrome camera. In a case where the image capture apparatus 1 is a color camera, a color filter is disposed at a location closer to an opening of the image capture apparatus 1 than the image sensor 4. The exposure controller 16 as an exposure control unit has an automatic exposure control function, and sends a command for adjusting the brightness of an image to the image sensor 4 based on image data generated by the image generation section 11. Since this controls an exposure level, the brightness of an image captured by the image capture apparatus 1 is adjusted.

The system controller 6 performs various control processes. The memory 7 is e.g. a RAM. The storage medium 8 is e.g. a ROM. The system controller 6 may be realized by a CPU that loads control programs stored in the storage medium 8 into the memory 7 and executes the loaded control programs. In the case of the configuration shown in FIG. 1, the image capture apparatus 1 including the image sensor 4 and the system controller 6 corresponds to an electronic apparatus. The system controller 6 may be provided as a separate external controller (e.g. a personal computer) from the image capture apparatus 1. In this case, the external controller functioning as the system controller 6 performs communication with the image capture apparatus 1, whereby the processes of the embodiments are realized. In this case, the external controller corresponds to the electronic apparatus.

The image processor 10 includes the image generation section 11, a first evaluation section 12, a second evaluation section 13, a halation evaluation section 14, and a threshold value determination section 15. The image generation section 11 generates image data based on digital captured image signals. The first evaluation section 12 evaluates a luminance of the image data to thereby label a blown-out highlight area (first luminance area) and one or a plurality of other luminance areas distributed around the blown-out highlight area. The first evaluation section 12 corresponds to a classification unit. The second evaluation section 13 as an evaluation unit estimates a luminance of an object and a luminance of ambient light from an exposure level to thereby evaluate the luminance of the object and the luminance of the ambient light. The halation evaluation section 14 evaluates, based on the distribution of the luminance areas detected by the first evaluation section 12, whether or not there has occurred halation having a small influence on the object visibility. The halation having a small influence on the object visibility is halation that is not required to be detected. Note that in the present embodiment, exposure or the brightness of illuminance (luminance) is defined based on an APEX (ADDITIVE SYSTEM OF PHOTOGRAPHIC EXPOSURE) system. For example, the difference between 1BV and 2BV of the object luminance corresponds to a difference of one level in the brightness of an object illuminance (luminance) in the APEX system.

The halation evaluation section 14 evaluates whether or not halation affecting the object visibility has occurred, by taking into account not only the distribution status of high-luminance areas in and around the blown-out highlight area but also the object luminance. The halation affecting the object visibility is detected according to the result of the evaluation by the halation evaluation section 14 as the detection unit. The threshold value determination section 15 determines a predetermined luminance value used by the second evaluation section 13 for evaluating the object luminance, and one or a plurality of luminance threshold values used by the halation evaluation section 14 for evaluating halation. The threshold value determination section 15 as a change unit changes the luminance threshold value(s) according to the object luminance evaluated by the second evaluation section 13.

Figure 2:
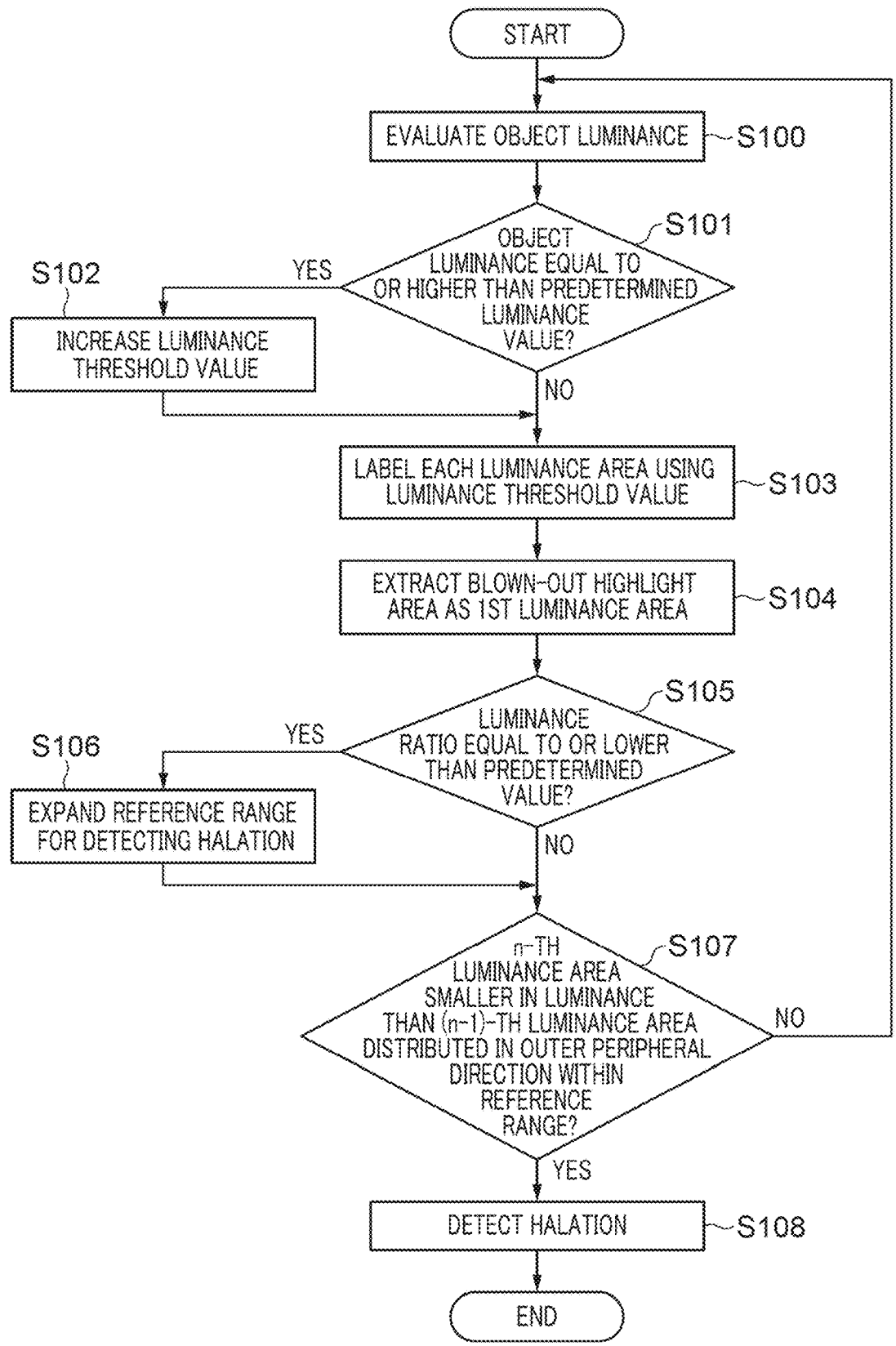
FIG. 2 is a flowchart of a halation detection process in the first embodiment.

Next, a halation detection process of the first embodiment will be described with reference to FIG. 2. The second evaluation section 13 estimates a luminance of an object from an exposure level to thereby evaluate the object luminance (S100). The threshold value determination section 15 determines whether or not the object luminance is equal to or higher than the predetermined luminance value (S101). The predetermined luminance value can be set to a desired value. If the answer to the question of the step S101 is affirmative (YES), the threshold value determination section 15 increases the luminance threshold value(s) for use in classifying luminance areas in image data (S102), and then the process proceeds to a step S103. If the answer to the question of the step S101 is negative (NO), the process directly proceeds to the step S103. In the step S103, the first evaluation section 12 detects a plurality of luminance areas from the image data, by using the one or the plurality of luminance threshold values, and labels the detected luminance areas. This labeling is processing for classifying the luminance areas of the image data. As mentioned above, if the answer to the question of the step S101 is affirmative (YES), the threshold value determination section 15 sets the luminance threshold value(s) to a higher value or higher values. The initial value of each luminance threshold value may be a desired value. For example, the initial values of the luminance threshold values may be luminance threshold values for detecting halation under a low-illuminance environment, such as at night, at dawn, or in the evening. If the answer to the question of the step S101 is affirmative (YES), the threshold value determination section 15 changes the luminance threshold value(s) from the initial value(s) to a higher value or higher values.

The first evaluation section 12 labels an area having the highest luminance level (luminance equal to or higher than a first luminance threshold value) as a first luminance area. Then, the first evaluation section 12 labels, as an n-th area, an area with a luminance which is equal to or higher than an n-th luminance threshold value (n is an integer of equal to or larger than 2), and also is smaller than an (n−1)-th luminance threshold value, with the first luminance area in the center. As the value of "n" becomes larger, the luminance level of the n-th area becomes lower. The first luminance area is a blown-out highlight area, for example.

Figure 3:
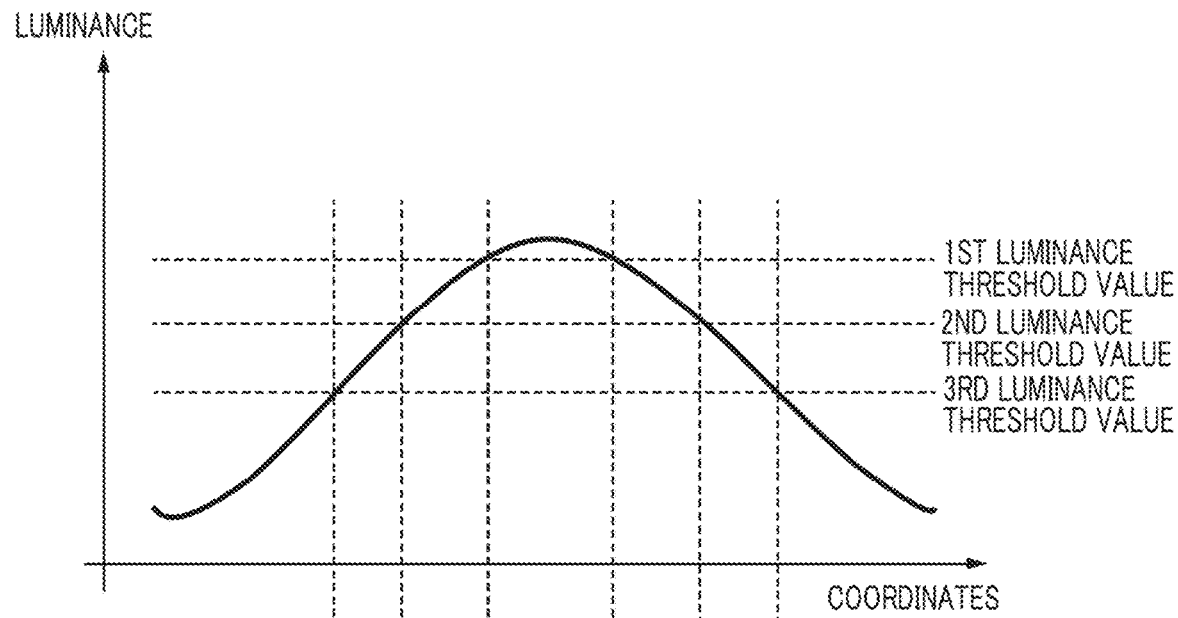
FIG. 3 is a diagram showing an example of luminance gradients and luminance areas.
Figure 3:
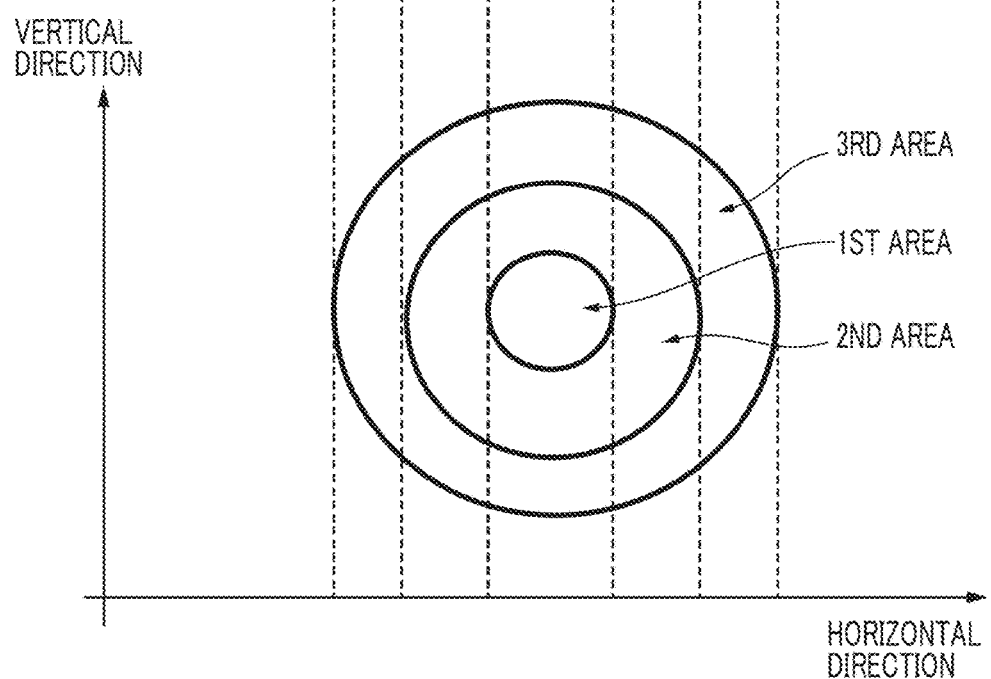

FIG. 3 is a diagram showing an example of luminance gradients and luminance areas. FIG. 3 shows a case of "n=3", in which the first luminance threshold value, a second luminance threshold value, and a third luminance threshold value are used. In FIG. 3, (A) shows a relationship between luminance gradients of the image data and the luminance threshold values, and (B) shows the distributions of the luminance areas (labeled luminance areas) corresponding to (A) of FIG. 3. The first luminance area is an area having the highest luminance level, i.e. an area with luminance equal to or higher than the first luminance threshold value. As shown in (B) in FIG. 3, a second luminance area is distributed concentrically with the first luminance area in the center, and a third luminance area is distributed outside the second luminance area. The halation evaluation section 14 detects halation when there are distributed luminance areas in which the luminance becomes lower in an outer peripheral direction, with the first luminance area in the center, as in (B) in FIG. 3.

Here, if the answer to the question of the step S101 is affirmative (YES), the processing in the step S102 is executed. More specifically, if the object luminance is bright, the threshold value determination section 15 increases the luminance threshold value(s). With this, if the object luminance is bright, the gradation of luminance around the blown-out highlight area is maintained, and the halation evaluation section 14 ceases to detect halation that is not required to be detected.

Since halation is liable to occur around the blown-out highlight area, the halation evaluation section 14 extracts the labeled first luminance area as the blown-out highlight area (S104). By focusing on the luminance distribution status around the blown-out highlight area, the halation evaluation section 14 performs evaluation of halation detection. The halation evaluation section 14 determines, according to the object luminance, a range of reference (scanning) for evaluation of halation detection from the first luminance area (blown-out highlight area) as the center. This is because the degree of influence of halation on the object visibility recognizability varies with a luminance ratio between the ambient light and a high-luminance object. As the high-luminance object, a white object, such as a vehicle license plate, for example, is assumed.

When a high-luminance object enters the angle of view of the image capture apparatus 1, an exposure amount is changed for brightness correction. When a change in the exposure amounts of two successive frames (image data items) of a moving image captured by the image capture apparatus 1 is large, the luminance ratio between the ambient light and the high-luminance object is also large. In a case where the luminance ratio between the ambient light and the high-luminance object is large, it is expected that the degree of influence of halation on the visibility of the object is large. On the other hand, in a case where the change in the exposure amounts of two successive frames is small, the luminance ratio between the ambient light and the high-luminance object is small. In this case, it is expected that the degree of influence of halation on the visibility of the object is small. The halation evaluation section 14 does not detect such a degree of halation as will not affect the object visibility. When halation is detected, control for suppressing the influence of halation on the image data is performed. For example, in a case where the image capture apparatus 1 has an insertion/removal mechanism provided on an optical path of the photographic lens 3, for inserting and removing a filter (e.g. a visible light cut filter) which cuts specific wavelength light, the insertion/removal mechanism inserts the filter into the optical path according to the detection of halation. This makes it possible to suppress the influence of halation.

However, when the visible light cut filter is inserted into the optical path, light having a visible light component is cut, and hence the image quality of the image data is reduced. To solve this problem, the halation evaluation section 14 does not detect such a degree of halation as will not affect the object visibility as halation. This prevents the image quality of the image data from being reduced by detection of halation which is not required to be detected.

Here, in halation detection focusing on luminance gradients around the blown-out highlight area (first luminance area), detection accuracy tends to depend on object luminance around the blown-out highlight area. More specifically, irrespective of the degree of influence of halation, when the object luminance around the blown-out highlight area is high, the object luminance around the blown-out highlight area is detected as luminance caused by flare. Therefore, the halation detection focusing simply on the luminance gradients around the blown-out highlight area has low reliability. To cope with this, the halation evaluation section 14 determines whether or not the luminance ratio between the ambient light and the high-luminance object is equal to or lower than a predetermined value (S105). As described above, the luminance ratio between the ambient light and the high-luminance object is acquired based on a change in the exposure amounts of two successive frames. For example, the luminance ratio between the ambient light and the high-luminance object is acquired based on a value obtained by differentiating the change in the exposure amounts of two successive frames with respect to time. If the answer to the question of the step S105 is affirmative (YES), the luminance ratio between the ambient light and the high-luminance object is small. In this case, the halation evaluation section 14 expands the reference range for detecting halation (S106). For example, the halation evaluation section 14 expands the reference range for detecting halation not only to the first and second luminance areas but also to the third luminance area. With this, even when the luminance ratio between the ambient light and the high-luminance object is small, it is possible to improve the reliability of the halation detection. On the other hand, if the answer to the question of the step S105 is negative (NO), the process proceeds to a step S107, and in this case, the halation evaluation section 14 may continue setting the reference luminance area for detecting halation e.g. to the first luminance area and the second luminance area.

The halation evaluation section 14 determines whether or not an n-th luminance area smaller in luminance than an (n−1)-th luminance area is distributed in the outer peripheral direction within the reference range (S107). That is, the halation evaluation section 14 performs halation determination by evaluating that there are distributed luminance areas in which the luminance level becomes lower from the first luminance area in the outer peripheral direction, as shown in FIG. 3. If the answer to the question of the step S107 is affirmative (YES), the halation evaluation section 14 detects halation (S108). On the other hand, if the answer to the question of the step S107 is negative (NO), the process returns to the step S100. In this case, halation is not detected. That is, halation having a small influence on the object visibility (halation which is not required to be detected) is not detected. The halation detection process in the first embodiment is performed, as described above.

In a case where halation is detected based on the first luminance area and the other luminance areas (luminance areas distributed around the first luminance area), halation having a small influence on the object visibility is also detected. However, the system controller 6 of the present embodiment evaluates the object luminance based on an exposure level at which the image data was acquired. Then, the system controller 6 detects halation based on the object luminance, the first luminance area, and other luminance areas. This suppresses the detection of halation which has a small influence on the object visibility and is not required to be detected.

If the answer to the question of the step S101 is affirmative (YES), the object luminance is bright. When the object luminance is bright, it is assumed that the degree of influence of halation caused by vehicle headlights and the like on the object visibility is small. In this case, the threshold value determination section 15 increases the luminance threshold value(s) for labeling the luminance areas. As a consequence, when the object luminance is bright, the luminance levels of the luminance areas used for the determination in the step S107 becomes higher. In this case, the distributions of the luminance areas, as shown in FIG. 3, cease to be detected. Therefore, the halation evaluation section 14 ceases to detect halation which is not required to be detected.

As described above, the halation evaluation section 14 detects halation that affects object visibility based on whether or not the n-th area exists which indicates that the luminance becomes lower in the outer peripheral direction, with the first luminance area in the center. The halation evaluation section 14 may detect halation that affects the object visibility by a method other than the method described above. For example, the halation evaluation section 14 may detect halation by setting the first luminance area as the blown-out highlight area and a luminance area other than the first luminance area as a flare area, and evaluating an area ratio between the blown-out highlight area and the flare area.

Figure 4:
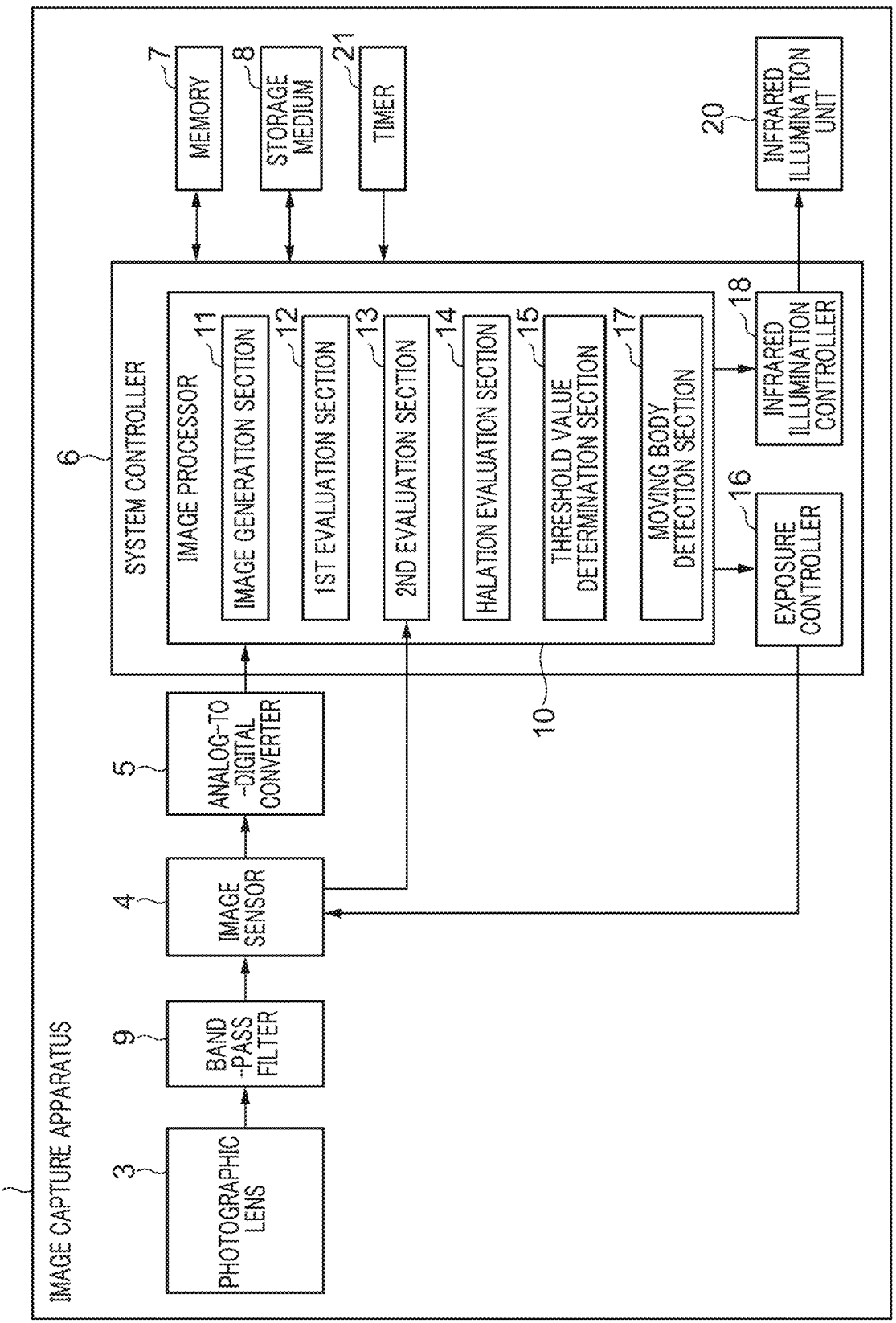
FIG. 4 is a block diagram of an image capture apparatus according to a second embodiment of the present invention.

Next, a description will be given of a second embodiment of the present invention. Halation is liable to occur when the luminance ratio between the ambient light and the high-luminance object is large. For example, halation often occurs at night, etc. In a case where the image capture apparatus 1 is applied to a camera or the like for performing public road surveillance, there can occur not only halation caused by vehicle headlights but also halation caused by light of a street lamp in image data of an image captured by the image capture apparatus 1. An image capture apparatus 2 according to the second embodiment excludes light of a stationary body, such as a street lamp, from targets from which halation is to be detected. FIG. 4 is a block diagram of the image capture apparatus 2 according to the second embodiment. The image capture apparatus 2 according to the second embodiment is different from the image capture apparatus 1 according to the first embodiment shown in FIG. 1 in that the image capture apparatus 2 further includes a band-pass filter 9, a moving body detection section 17, an infrared illumination controller 18, an infrared illumination unit 20, and a timer 21. The other components of the image capture apparatus 2 according to the second embodiment are configured similar to those of the image capture apparatus 1 according to the first embodiment, and hence description thereof is omitted.

The band-pass filter 9 is disposed such that it can be inserted and removed between the photographic lens 3 and the image sensor 4. The band-pass filter 9 cuts light in a specific wavelength range. The band-pass filter 9 is inserted into and removed from an optical path of incident light from the photographic lens 3 by a predetermined insertion/removal mechanism. The infrared illumination controller 18 performs control for causing infrared light to be irradiated from the infrared illumination unit 20. The timer 21 counts time, and when a predetermined time period has elapsed, notifies the system controller 6 of the fact.

The band-pass filter 9 is assumed to include an infrared cut filter for cutting infrared light and a visible light cut filter for cutting visible light. For example, in a case where the halation evaluation section 14 has detected occurrence of halation, with a view to restoring object visibility, the above-mentioned predetermined insertion/removal mechanism inserts the visible light cut filter of the band-pass filter 9 into the optical path of incident light from the photographic lens 3. Then, the predetermined insertion/removal mechanism removes the infrared cut filter of the band-pass filter 9 from the optical path of incident light incident from the photographic lens 3. This reduces the degree of influence of halation. The insertion/removal of the band-pass filter 9 is controlled by the system controller 6, for example. In a case where the system controller 6 performs control for inserting the visible light cut filter into the optical path of incident light, the infrared illumination controller 18 causes infrared light to be irradiated from the infrared illumination unit 20. In doing this, the infrared illumination controller 18 controls the infrared illumination unit 20 such that infrared light having higher illuminance than light of the reduced halation is irradiated. With this control, brightness of image data acquired by the image capture apparatus 2 is ensured, and the halation is more reduced.

The memory 7 temporarily stores image data generated by the image generation section 11. When the system controller 6 receives the notification notifying the lapse of the predetermined time period from the timer 21, the image processor 10 updates a reference image for background subtraction in movement detection to image data acquired at the time of receiving the notification. In the second embodiment, the image capture apparatus 2 distinguishes between halation caused by a stationary body and halation caused by a moving body, and narrows the targets from which halation is to be detected to the moving body. The stationary body corresponds to a physical object that does not move. The moving body corresponds to a physical object that moves.

Next, a halation detection process of the second embodiment will be described with reference to FIG. 5. The FIG. 5 flowchart is formed by adding steps of S207, S208, S209, and S212 to the FIG. 2 flowchart of the first embodiment. Since steps S200 to S206, S210, and S211 other than the steps of S207, S208, S209, and S212 are the same as those of the FIG. 2 flowchart, description thereof is omitted. The moving body detection section 17 performs movement detection by background subtraction, and determines whether or not there is a moving body, based on a difference from the reference image in the background subtraction (S207). FIGS. 6A and 6B are diagrams showing respective examples of the reference image and image data acquired when a time t has elapsed. FIG. 6A shows the reference image (image data used as a reference), and FIG. 6B shows the image data (frame t) acquired when the time t has elapsed. The image data is divided into a plurality of lattice-shaped areas, and both of the image data items of the reference image and the frame t contain an area S which is the blown-out highlight area (first luminance area). Since the area S is contained in both of the image data items of the reference image and the frame t, and hence it is possible to determine that the area S is a stationary body, such as a street lamp.

On the other hand, an area M, which is the blown-out highlight area of the frame t, is contained in the image data of the frame t, but is not contained in the reference image. Therefore, the area M can be determined to be a moving body, such as a vehicle. As described hereinabove, based on a binary image using the first threshold value, it is possible to determine whether or not there is a moving body. If the answer to the question of the step S207 is affirmative (YES), since there is a moving body, the process proceeds to a step S210. Thus, the halation evaluation section 14 can narrow the targets from which halation affecting the object visibility is to be detected to a moving body. As described above, the stationary body is excluded from the targets for detecting halation that affects the object visibility.

If the answer to the question of the step S207 is negative (NO), the system controller 6 determines whether or not the predetermined time period has elapsed (S208). When the predetermined time period has elapsed, the timer 21 notifies the system controller 6 of the fact. Therefore, as long as the system controller 6 does not receive the notification from the timer 21, the answer to the question of the step S208 is negative (NO). If the answer to the question of the step S208 is negative (NO), the process returns to the step S200. If the answer to the question of the step S208 is affirmative (YES), since it is determined that the predetermined time period has elapsed, and also that there is no moving body, the image processor 10 updates the reference image (S209). With this, it is possible to update the reference image to the latest image data every predetermined time period.

Figure 5:
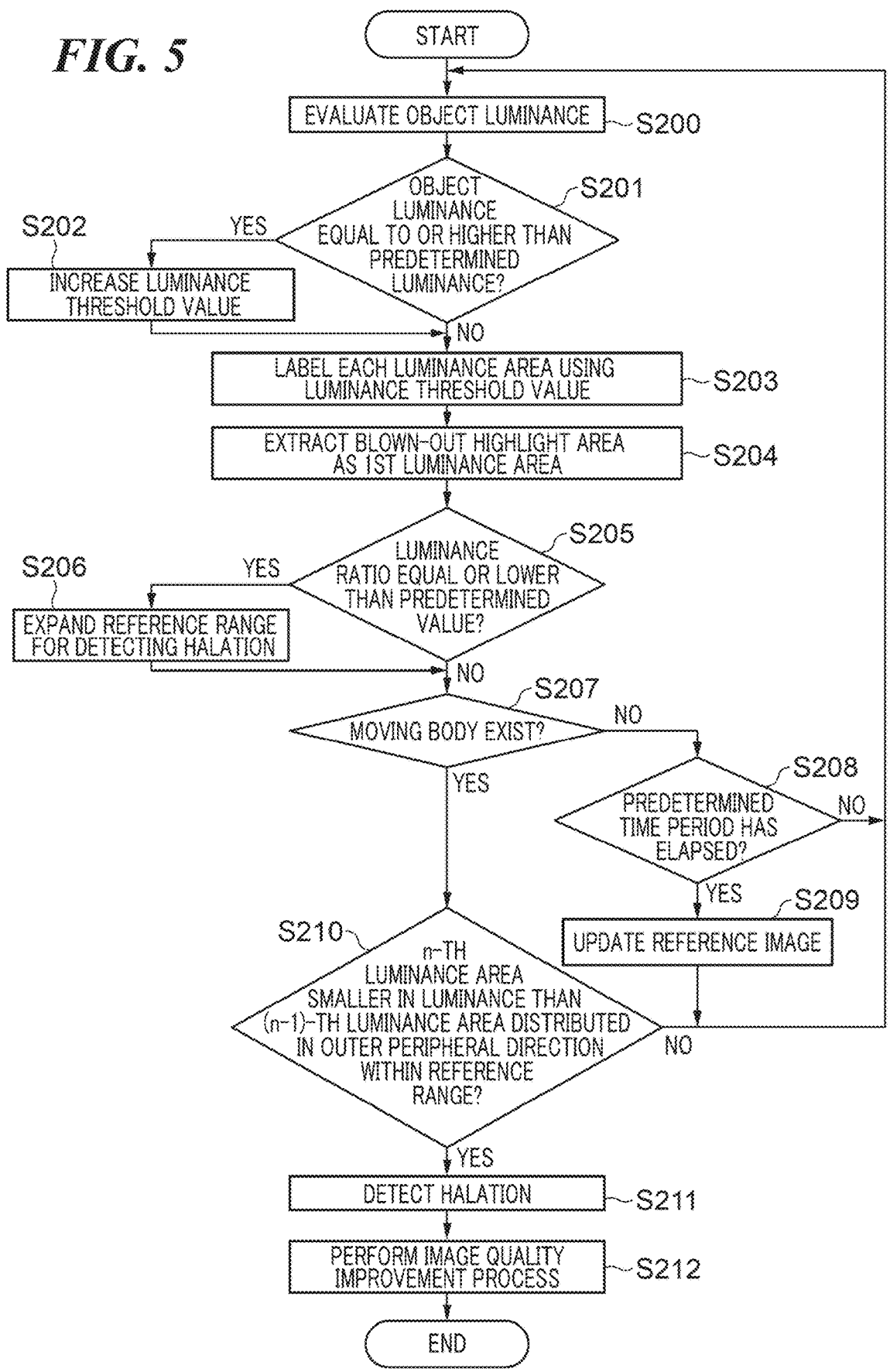
FIG. 5 is a flowchart of a halation detection process in the second embodiment.
Figure 6B:
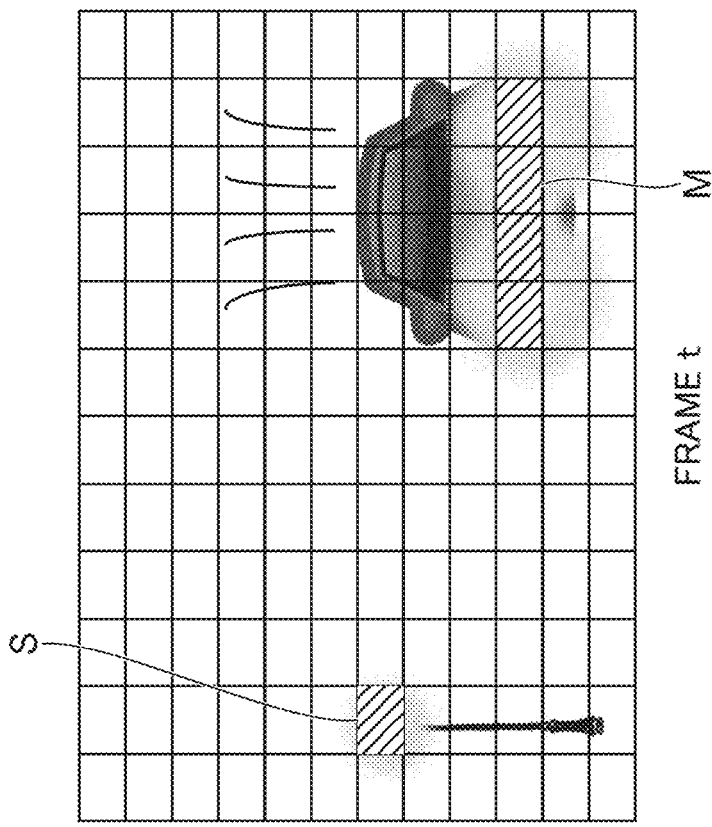
FIGS. 6A and 6B are diagrams showing examples of image data used to distinguish between a stationary body and a moving body.
Figure 6A:
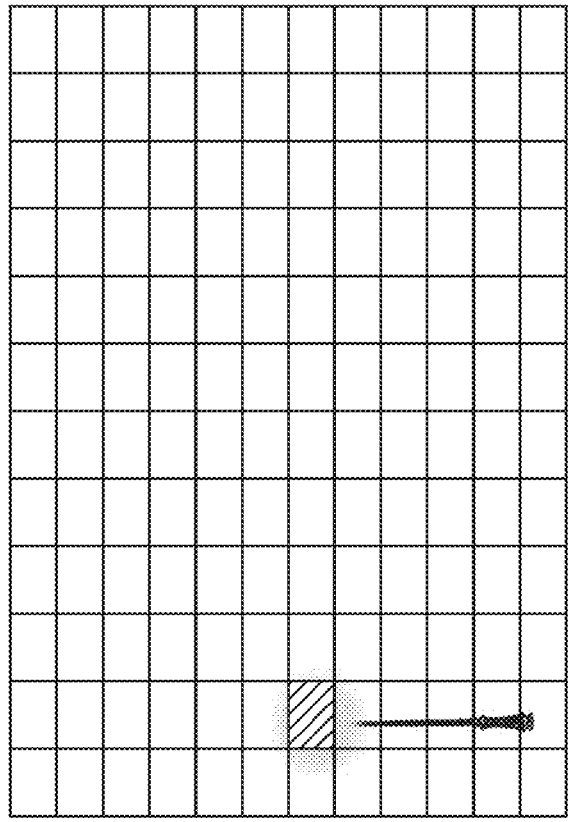

As shown in FIG. 5, when halation is detected in the step S211, the system controller 6 performs an image improvement process on image data acquired after detection of the halation (S212). For example, the exposure controller 16 may improve the image quality of the image data acquired after detection of the halation by executing exposure control, such as wide dynamic range processing (WDR processing). Further, the system controller 6 may perform control for causing the predetermined insertion/removal mechanism to insert the visible light cut filter of the band-pass filter 9 into the optical path of incident light. This reduces the halation to thereby improve the image quality of the image data acquired after detection of the halation. The processing in the step S212 may be executed in the first embodiment.

Figure 7:
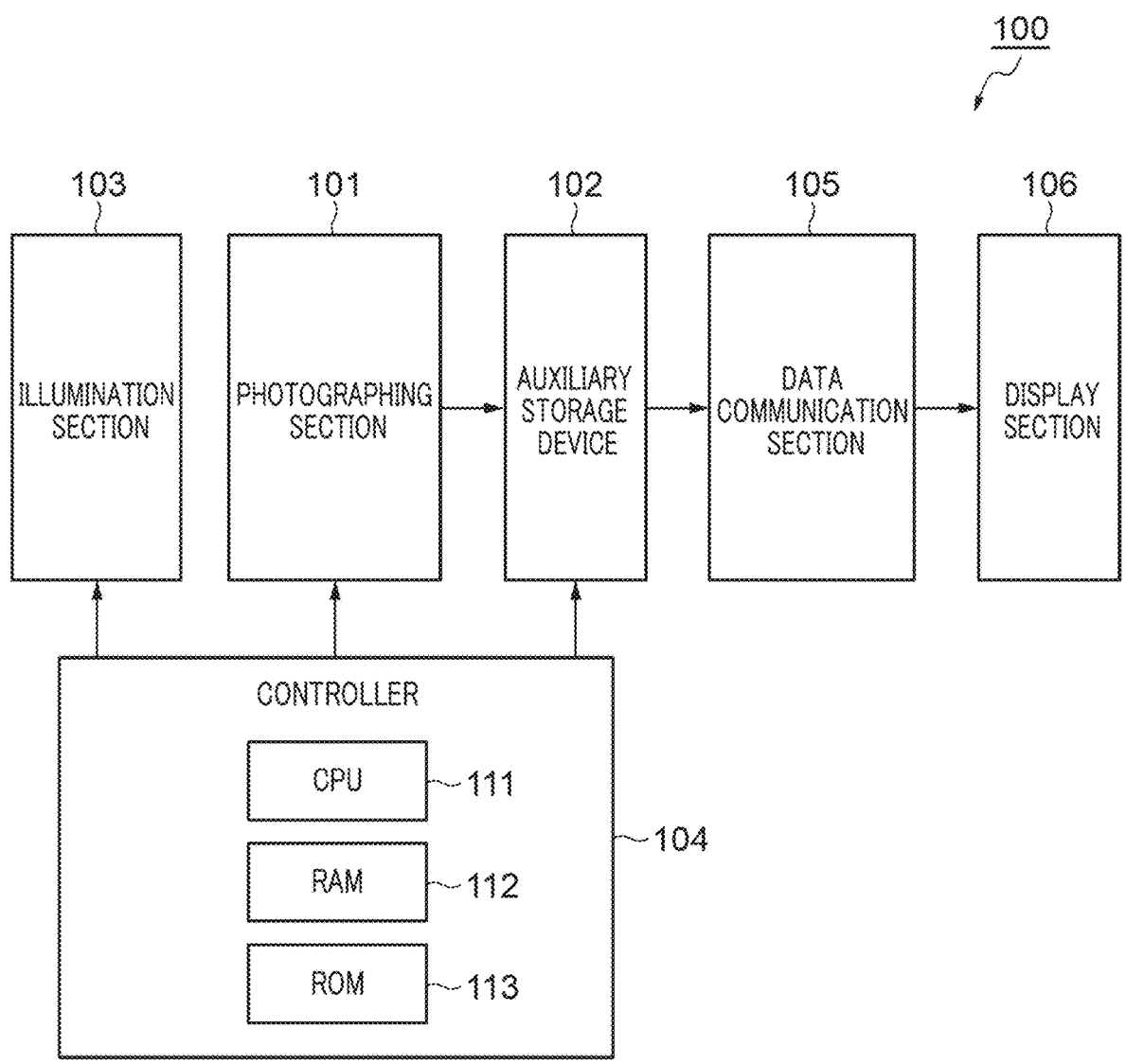
FIG. 7 is a block diagram of an image capture apparatus according to a third embodiment of the present invention.

Next, a description will be given of a third embodiment of the present invention. FIG. 7 is a block diagram of an image capture apparatus 100 according to the third embodiment. The image capture apparatus 100 is comprised of a photographing section 101, an auxiliary storage device 102, an illumination section 103, a controller 104, a data communication section 105, and a display section 106. The following description will be given assuming that the image capture apparatus 100 is applied to a camera for public road surveillance. The image capture apparatus 100 may be a public road surveillance camera for unattended operation. However, the image capture apparatus 100 may be used for a purpose other than the public road surveillance. Further, although the description is given assuming that the image capture apparatus 100 performs moving image photographing, the image capture apparatus 100 may perform still image photographing. In a case where the image capture apparatus 100 is applied to the camera for public road surveillance, a vehicle's appearance, a vehicle license plate, or the like is assumed as an object. For example, in a case where the image capture apparatus 100 performs public road surveillance under a low illuminance (luminance) environment e.g. at night, vehicle headlights each using halogen light as a light source sometimes causes halation in an image obtained by photographing an object using the image capture apparatus 100. If the image is affected by the halation caused by the vehicle headlights, the visibility of the vehicle's appearance, the vehicle license plate, or the like is reduced, whereby it becomes difficult to determine the vehicle's appearance, the vehicle license plate, or the like from the image. Hereinafter, a description will be given of an example in which the image capture apparatus 100 suppresses occurrence of halation in an image by controlling the irradiation amount of illumination light having an infrared wavelength. Note that the image capture apparatus 100 may be applied to an image capture apparatus other than the camera for public road surveillance.

Although in the example shown in FIG. 7, the image capture apparatus 100 includes the illumination section 103, the controller 104, and the display section 106, the illumination section 103, the controller 104, and the display section 106 may be provided as devices separate from the image capture apparatus 100. For example, the illumination section 103 may be an external illumination device connected to the image capture apparatus 100. Further, the display section 106 may be an external display device which is wiredly or wirelessly connected to the data communication section 105 of the image capture apparatus 100. Further, the controller 104 as well may be provided as an external device (e.g. a personal computer) separate from the image capture apparatus 100. In this case, the external device (electronic device) having the functions of the controller 104 communicates with the image capture apparatus 100 to thereby perform various control processes of the present embodiment.

Figure 8:
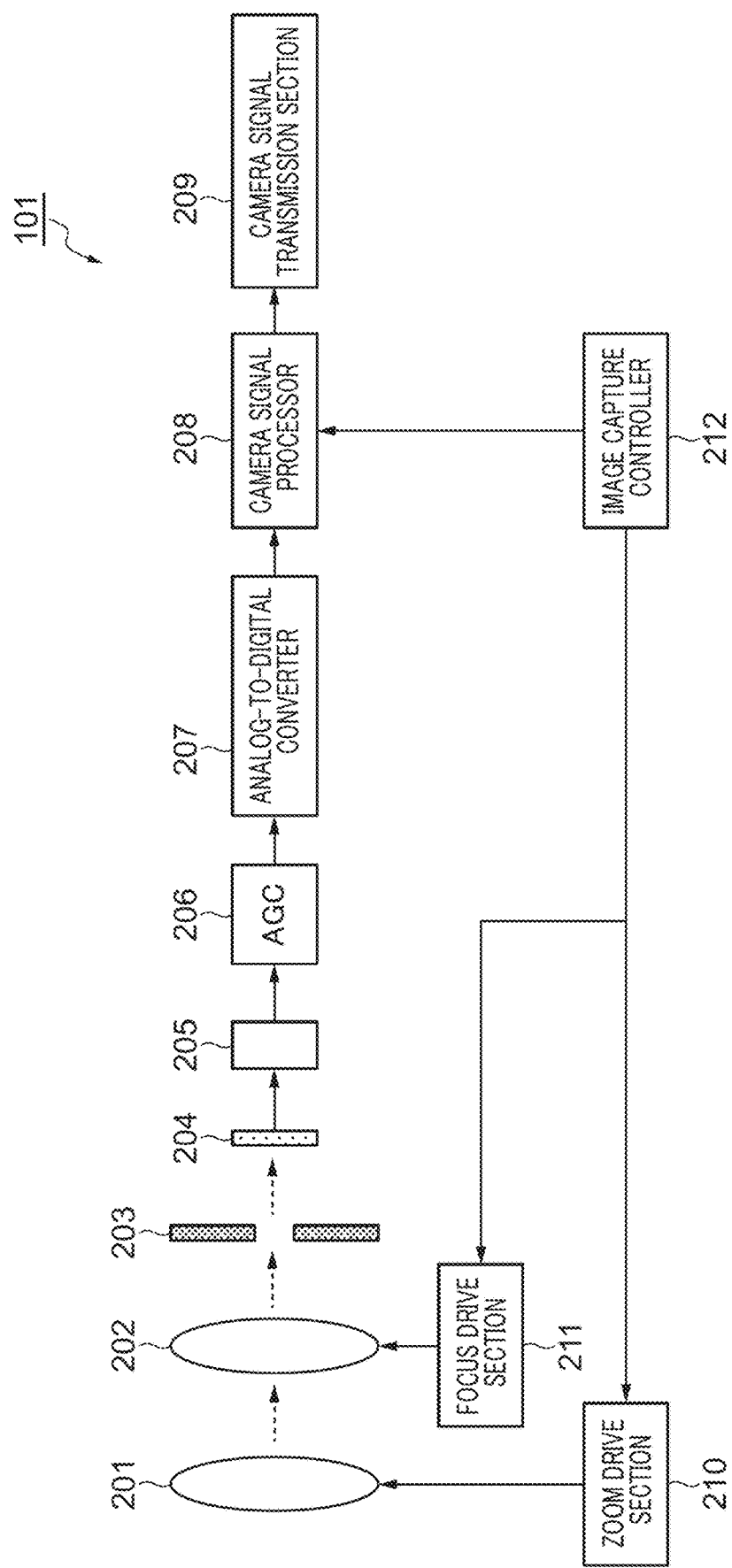
FIG. 8 is a block diagram of a photographing section.

FIG. 8 is a block diagram of the photographing section 101. The photographing section 101 operates under the control of the controller 104. The photographing section 101 is comprised of a zoom lens 201, a focus lens 202, a diaphragm unit 203, an optical filter 204, an image capture device 205, an AGC 206, and an analog-to-digital converter 207. Further, the photographing section 101 includes a camera signal processor 208, a camera signal transmission section 209, a zoom drive section 210, a focus drive section 211, and an image capture controller 212. In FIG. 8, arrows each indicated by a dotted line represent light, and arrows each indicated by a solid line represent signal lines. When incident light from a photographing target enters the photographing section 101, the photographing section 101 converts the incident light to digital signals for output. The image capture controller 212 controls the camera signal processor 208, the zoom drive section 210, and the focus drive section 211.

The zoom drive section 210 performs optical enlargement and reduction control of incident light by moving the zoom lens 201 back and forth on the image capture optical path. The focus drive section 211 performs focusing control of incident light by moving the focus lens 202 back and forth on the image capture optical path. The exposure amount of light having passed through the zoom lens 201 and the focus lens 202 is adjusted by the diaphragm unit 203. The light whose exposure amount has been adjusted by the diaphragm unit 203 passes through the optical filter 204. The light having passed through the optical filter 204 is captured as an image by the image capture device 205. In the present embodiment, the optical filter 204 is described assuming that it is a visible light cut filter for cutting light in the wavelength range of visible light. In this case, light entering the image capture device 205 is infrared wavelength light. However, the optical filter 204 is not limited to the visible light cut filter. For example, the optical filter 204 may be made of dummy glass that transmits light in all wavelength ranges. Further, the optical filter 204 can be inserted into and removed from the image capture optical path. In this case, the predetermined insertion/removal mechanism controls the insertion/removal of the optical filter 204 into/from the image capture optical path. For example, the optical filter 204 may be an IR cut filter for cutting infrared wavelength light. In this case, the insertion/removal mechanism removes the IR cut filter as the optical filter 204 from the image capture optical path.

Light captured as an image by the image capture device 205 is converted to analog signals, and the analog signals are electrically amplified by the AGC (auto gain control) 206. The analog-to-digital converter 207 converts the amplified analog signals to digital signals. The camera signal processor 208 performs development processing, such as demosaicing, on the digital signals output by the analog-to-digital converter 207. Thus, a digital image is formed. The camera signal transmission section 209 transmits the formed digital image to the auxiliary storage device 102 or an external device.

The auxiliary storage device 102 stores the above-mentioned digital image, various evaluation values indicative of the internal states of the photographing section 101, commands from the controller 104, and so forth. The various evaluation values indicate the respective states of the zoom lens 201, the focus lens 202, the diaphragm unit 203, and the optical filter 204. Information stored in the auxiliary storage device 102 may be stored in a RAM 112 of the controller 104. Further, the commands from the controller 104 include commands for image quality correction, detection processing with respect an object, and so forth. In the present embodiment, the image quality correction refers to image quality correction processing for improving the image quality of an object, such as processing for changing a γ curve according to the state of a luminance histogram, and processing for changing saturation according to an estimated EV value. As the processing for changing the γ curve, for example, in a case where the luminance histogram is biased toward low luminance at a predetermined ratio, it is possible to apply processing for shifting the γ curve toward high luminance. As the processing for changing the saturation according to the estimated EV value, in a case where the estimated EV value is lower than a predetermined value, it is possible to apply processing for reducing the saturation. The EV value corresponds to a value that serves as an index of brightness. On the other hand, the detection processing is processing for detecting at least a halation phenomenon. When the illuminance of an image capture environment under which an image is captured by the photographing section 101 is low (when the illuminance is equal to or lower than a predetermined illuminance), or when the controller 104 has detected halation, the amount of irradiation light (irradiation light amount) is increased under the control of the controller 104. Hereinafter, the illumination section 103 is described assuming that it irradiates infrared light.

The controller 104 appearing in FIG. 7 performs various processing processes. The controller 104 is comprised of a CPU 111, the RAM 112, and a ROM 113. The functions of the controller 104 may be realized by the CPU 111 that loads control programs stored in the ROM 113 into the RAM 112, and executes the control programs loaded into the RAM 112. In the present embodiment, when the controller 104 detects halation by referring to image data temporarily stored in the auxiliary storage device 102, the controller 104 controls the irradiation light amount of the illumination section 103. Further, the controller 104 estimates an EV value of the image capture environment by evaluating the state of the photographing section 101 and the image data temporarily stored in the auxiliary storage device 102, and controls the exposure amount of the photographing section 101 based on estimation results. Further, the controller 104 performs image quality correction of an image temporarily stored in the auxiliary storage device 102. Upon input of the image data output from the auxiliary storage device 102, the data communication section 105 transmits the input image data to the display section 106. For example, in a case where the display section 106 is not incorporated in the image capture apparatus 100 but is provided outside the image capture apparatus 100, the data communication section 105 performs wired or wireless communication between the auxiliary storage device 102 and the display section 106. Upon input of the image data output from the data communication section 105, the display section 106 displays the image data. This makes it possible for the display section 106 to present an image of the object to a user. In a case where the image data input to the display section 106 has been compressed by the controller 104, the display section 106 decompresses the image data before displaying the same.

Next, a process performed in the present embodiment will be described with reference to FIG. 9. In the present embodiment, the illumination section 103 increases the illuminance of the image capture environment by irradiating infrared light. As described hereinabove, when the image capture apparatus 100 captures an image of an object for public road surveillance, the illumination section 103 irradiates near-infrared wavelength light, for example, as infrared light, such that no visual load is imposed on a vehicle driver. First of all, a visible light cut filter as the optical filter 204 is set on the image capture optical path (S301). For example, in a case where the image capture apparatus 100 includes an insertion/removal mechanism for inserting/removing the visible light cut filter, the insertion/removal mechanism inserts the visible light cut filter as the optical filter 204 into the image capture optical path. The visible light cut filter may be set on the image capture optical path by a desired method. By setting the visible light cut filter on the image capture optical path, light entering the image capture device 205 becomes infrared wavelength light. With this, even when halation has occurred, the degree of influence of halation on image data is reduced.

The controller 104 sets, in the illumination section 103, a sufficient light amount enabling image capture with excellent brightness under an image capture environment without halation, as a first light amount, and causes the illumination section 103 to irradiate infrared light (S302). The photographing section 101 performs photometry of a scene to be shot, by a predetermined photometry method under the control of the controller 104 (S303). The user can set the photometry method as desired. The photographing section 101 sets a first shutter speed at which correct exposure is achieved (S304). To evaluate the intensity of halation, referred to hereinafter, the controller 104 estimates an EV value of the image capture environment based on a state of exposure in a scene free from halation and luminance information of acquired image data, and stores the EV value in the auxiliary storage device 102 (S305). Note that in the present embodiment, the exposure and the brightness of luminance (illuminance) are defined based on the APEX (ADDITIVE SYSTEM OF PHOTOGRAPHIC EXPOSURE) system. For example, the difference between an exposure of 1BV and an exposure of 2BV corresponds to a difference of one level in the brightness of the exposure in the APEX system. The controller 104 determines whether or not halation has occurred (S306). If the answer to the question of the step S306 is affirmative (YES), it means that halation is detected, whereas if the answer to the question of the step S306 is negative (NO), it means that halation is not detected.

Figure 10:
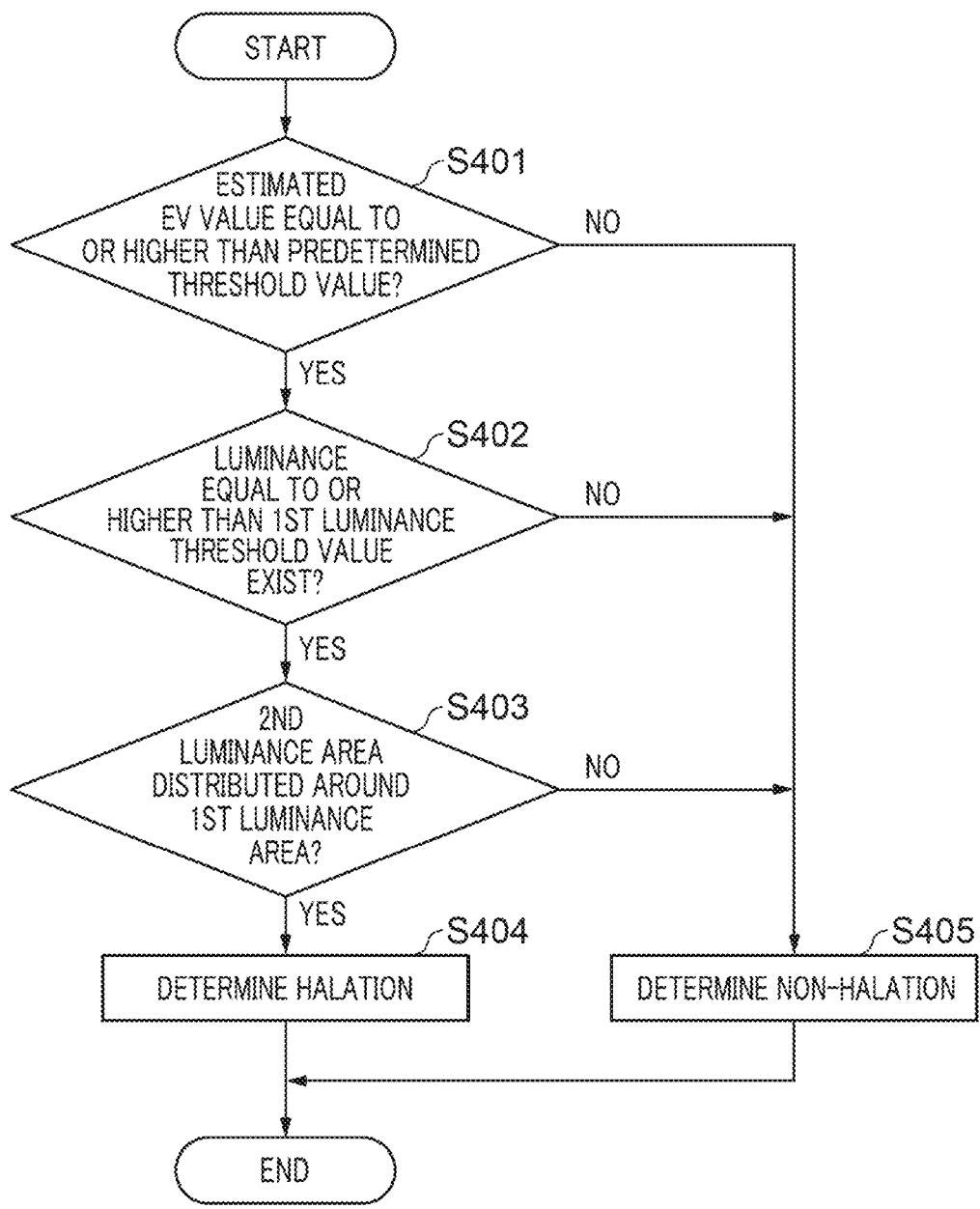
FIG. 10 is a flowchart of a determination process for determining whether or not halation has occurred.

Next, the determination process for determining whether or not halation has occurred (S306) will be described with reference to FIG. 10. The controller 104 determines whether or not the estimated EV value is equal to or larger than a predetermined threshold value (S401). The predetermined threshold value may be set as desired. For example, the predetermined threshold value may be a value empirically set in advance. Further, the predetermined threshold value may be a value associated with an amount of change from an estimated EV value of the immediately preceding acquired image data. For example, when a constant estimated EV value continues, the controller 104 may set the constant estimated EV value as the predetermined threshold value.

If the answer to the question of the step S401 is affirmative (YES), the controller 104 determines whether or not a luminance equal to or higher than the first luminance threshold value exists in the acquired image data (S402). The first luminance threshold value is for filtering a high-luminance area, such as the blown-out highlight area. The first luminance threshold value may be set to a desired value. For example, the first luminance threshold value may be a desired value empirically obtained.

If the answer to the question of the step S402 is affirmative (YES), since a high-luminance area (first luminance area) exists in the image data, there is a possibility that halation has occurred. In this case, the controller 104 determines whether or not the second luminance area is distributed around the first luminance area (S403). The second luminance area is an area with a luminance equal to or higher than the second luminance threshold value which is lower than the first luminance threshold value. The luminance equal to or higher than the second luminance threshold value indicates that it is a luminance of an area around the high-luminance area in the halation phenomenon, an image of which is captured due to charge leakage in the image capture device 205. In short, the second luminance threshold value represents a luminance indicating charge leakage caused by halation. The luminance in the second luminance area is lower than the luminance in the first luminance area. When the second luminance area is distributed in the image data in a manner adjacent to the first luminance area, the answer to the question of the step S403 is affirmative (YES). If the answer to the question of the step S403 is affirmative (YES), there is a high possibility of occurrence of halation, and hence the controller 104 determines that halation has occurred (S404).

On the other hand, if the answer to the question of any of the steps S401, S402, and S403 is negative (NO), there is a low possibility of occurrence of halation. In this case, the controller 104 determines that halation has not occurred (S405). Thus, based on the luminance information of the image data, it is determined whether or not halation has occurred.

Figure 11:
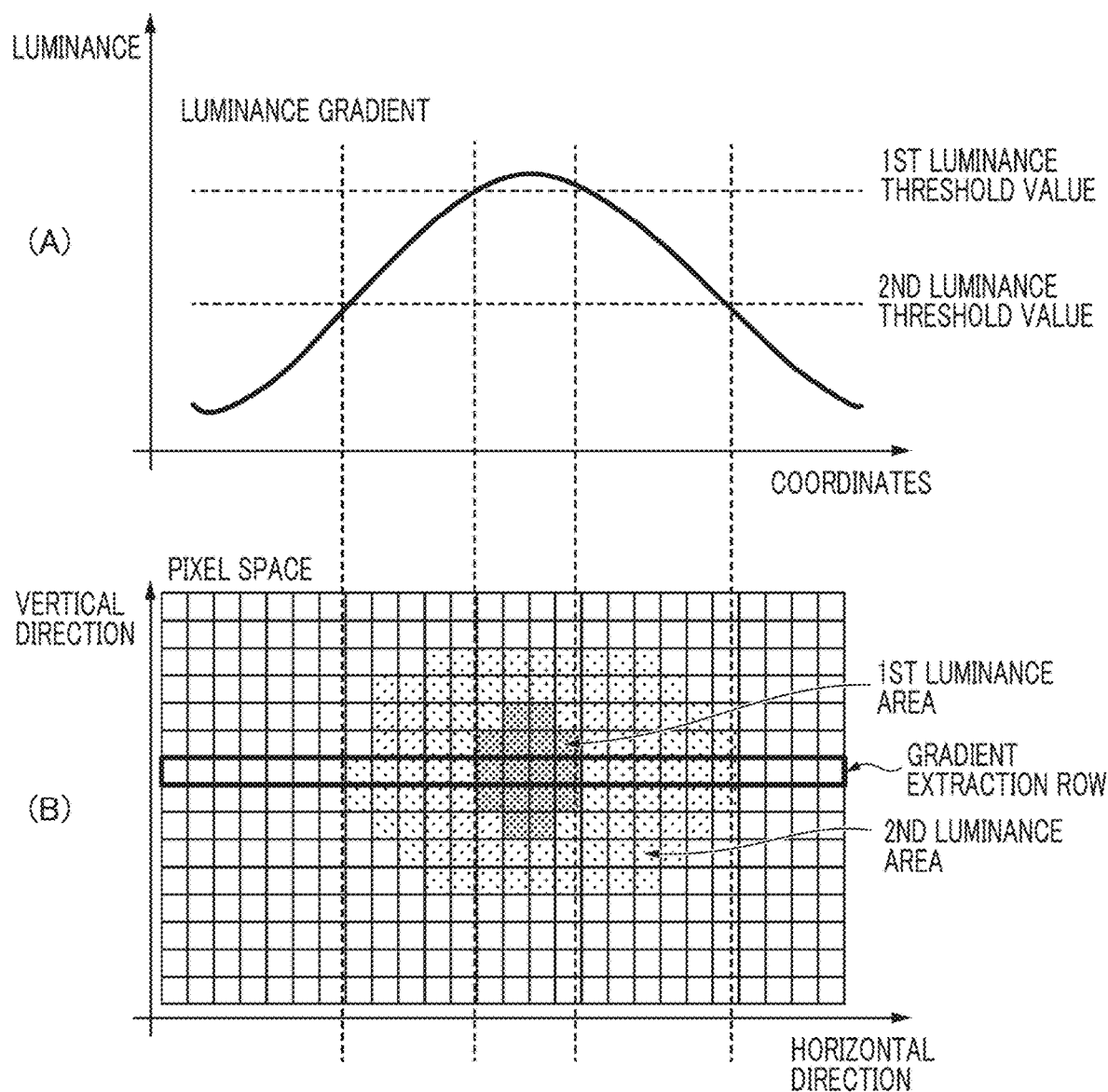
FIG. 11 is a diagram showing an example of luminance gradients and a pixel space.

FIG. 11 is a diagram showing an example of luminance gradients and a pixel space. In FIG. 11, (A) shows luminance gradients in a gradient extraction row appearing in (B), and (B) shows the pixel space of the image data. In (A) of FIG. 11, a luminance close to the center of the luminance gradients is equal to or higher than the first luminance threshold value. Therefore, in this case, the answer to the question of the step S402 is affirmative (YES). Further, as shown in (B) of FIG. 11, the second luminance area is distributed in the vicinity of the first luminance area. Therefore, in this case, the answer to the question of the step S403 is affirmative (YES). Thus, if the estimated EV value is equal to or higher than the predetermined threshold value, the controller 104 determines that halation has occurred.

Figure 9:
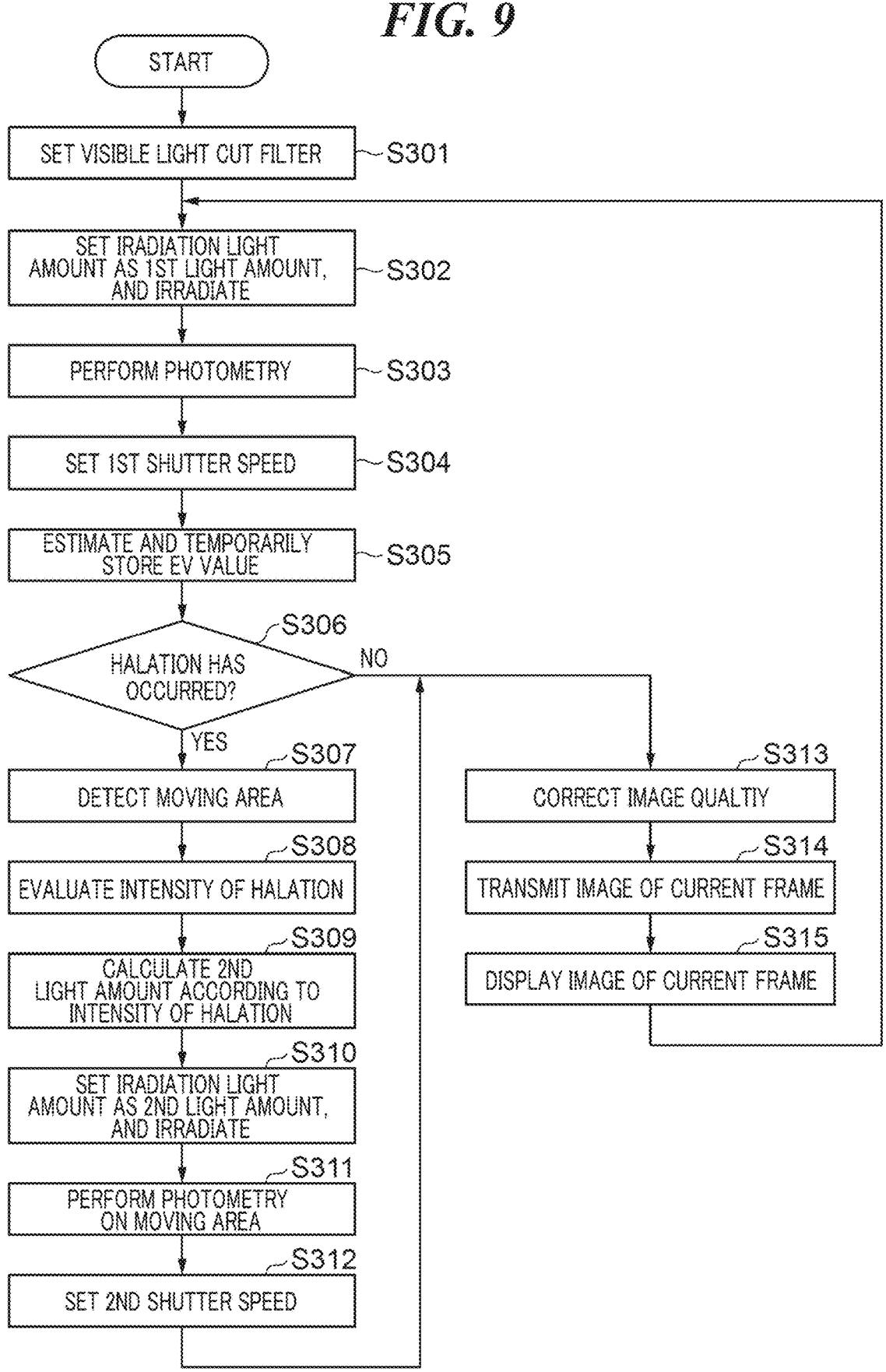
FIG. 9 is a flowchart of a process performed in the third embodiment.

If it is determined that halation has occurred, by the above-described determination process for determining whether or not halation has occurred, the answer to the question of the step S306 in FIG. 9 is affirmative (YES). In this case, the controller 104 refers to the immediately preceding image data (immediately preceding frame) temporarily stored in the auxiliary storage device 102. Then, the controller 104 detects a moving area by comparing the immediately preceding frame and the current frame (acquired image data) which are different in time (S307). Further, the controller 104 evaluates the intensity of the halation (S308). The steps S308 and S309 are for deriving a sufficient irradiation light amount (second light amount) to suppress halation. In the present embodiment, the controller 104 evaluates the intensity of the halation using a difference between the current estimated EV value and an estimated EV value stored in the past, as expressed by the following equation (1):

$$d_{ev} = ev - ev_{pre} \tag{1}$$

In the above equation (1), "$d_{ev}$" represents the difference. "ev" represents the current estimated EV value. "$ev_{pre}$" represents the estimated EV value stored in the past. The difference "$d_{ev}$" is an index of evaluation of the intensity of the halation. The halation intensity may be evaluated by a method other than the above-described method. For example, the halation intensity may be evaluated by an area ratio between the first luminance area and the second luminance area appearing in FIG. 11.

The controller 104 derives the second light amount for suppressing the halation according to the evaluated halation intensity, from the following equation (2) (S309):

$$l_2 = m_{hal}\{1 - \exp(-ad_{ev})\}(l_{max} - l_{def}) + l_{def} \tag{2}$$

In the above equation (2), "$l_2$" represents the second light amount for suppressing the halation. "$m_{hal}$" represents a mask parameter indicative of a result of the determination of halation, and takes a value of 0 or 1. "a" represents an adjustment parameter adjusted according to a scene to be shot, and takes a value equal to or larger than 0. "$d_{ev}$" is a value indicative of the above-mentioned evaluated intensity of the halation. "$l_{max}$" represents a maximum allowable irradiation light amount of the illumination section 103. "$l_{def}$" represents an irradiation light amount of the illumination section 103 obtained when it is not determined that halation has occurred, and corresponds to the first light amount. The controller 104 sets the above-mentioned second light amount "$l_2$" in the illumination section 103, to thereby cause the illumination section 103 to irradiate infrared light with the second light amount "$l_2$" (S310). The second light amount obtained by the above-mentioned equation (2) is larger than the first light amount. Therefore, if it is determined that halation has occurred, the irradiation light amount of the illumination section 103 is increased.

The image capture controller 212 of the photographing section 101 adjusts exposure in accordance with irradiation of light from the illumination section 103. The image capture controller 212 performs control for limiting a photometry area to the moving area detected in the step S307, and performs photometry control to adjust exposure to an object, (S311). Further, the image capture controller 212 controls a shutter speed, to thereby set a second shutter speed for achieving a correct exposure of a moving object (S312). By the above processing, image data with suppressed halation is acquired. If the answer to the question of the step S306 is affirmative (YES), the steps S307 to S312 are executed, whereby the irradiation light amount of the illumination section 103 is increased. On the other hand, if the answer to the question of the step S306 is negative (NO), since it is determined that halation has not occurred, the steps S307 to S312 are not executed. Note that as described hereinabove, in the step S311, the control for limiting the photometry area to the moving area and the photometry control for adjusting the exposure to the object are performed, but when the moving area ceases to be detected, a predetermined photometry method may be automatically set. The predetermined photometry method may be one of central emphasis, overall average, and spot photometry. Further, the user can set a desired one of the above photometry methods.

After the step S312, or when the answer to the question of the step S306 is negative (NO), the controller 104 corrects the image data to improve an image quality thereof (S313). With this, processing of one frame of image data is terminated. The data communication section 105 acquires the image data (current frame) temporarily stored in the auxiliary storage device 102, and transmits the image data to the display section 106 (S314). The display section 106 displays the current frame (S315). This makes it possible to present the current frame to the user.

For example, when a vehicle headlight using halogen light as a light source enters an image acquired by the image capture apparatus 100 photographing an object, image data is affected by halation, since the halogen light contains a large amount of infrared light, differently from LED. When the image data is affected by the halation, not the visibility of a headlight area with the halation but the visibilities of a vehicle appearance area, a vehicle license plate area, and so forth are reduced. This makes it difficult for the user to determine the appearance, license plate number, etc. of the vehicle from the image data displayed on the display section 106. To solve this problem, when it is determined in the step S306 that halation has occurred, the controller 104 causes the illumination section 103 to increase the amount of infrared light irradiated therefrom from the first light amount to the second light amount. With this, even when halation has occurred due to reception of a large amount of infrared wavelength light, since the amount of the infrared light irradiated from the illumination section 103 is increased, it is possible to suppress the influence of halation. Therefore, even if the influence of halation has occurred during acquisition of the image data, the visibilities of the appearance, license plate number, etc. of the vehicle of the image data displayed on the display section 106 are improved. Thus, it is possible to suppress the influence of halation which has occurred in the image, independently of the type of the light source. Further, when no occurrence of halation is detected in the step S306, the amount of infrared light is not increased. As a consequence, compared with a case where a large amount of infrared light is always irradiated, it is possible to reduce electric power consumed to irradiate infrared light.

Here, although the luminance of image data is higher when halation occurs, there is a possibility that an average luminance of the whole or part of image data is the same between when halation occurs and when halation does not occur. In the third embodiment, the controller 104 increases the amount of infrared light irradiated from the illumination section 103, not based on the average luminance, but when the answer to the question of the step S306 is affirmative (YES). In other words, when the answer to the question of the step S403 in FIG. 10 is affirmative (YES), the controller 104 increases the irradiation light amount of infrared light. This point applies to fourth and fifth embodiments described hereinafter.

Next, a description will be given of the fourth embodiment of the present invention. The construction of an image capture apparatus 100 according to the fourth embodiment is the same as that of the third embodiment. The controller 104 of the image capture apparatus 100 according to the fourth embodiment is equipped with a function of detecting a predetermined object. The controller 104 detects the predetermined object from image data, and performs emphasis processing on the detected object e.g. by setting a frame in an area of the object. The controller 104 causes the display section 106 to display the image data with an emphasized area provided in the area of the predetermined object. This makes it possible to present an image with high object visibility to the user. For example, in a case where the image capture apparatus 100 is applied to public road surveillance, it is assumed that the predetermined object is a vehicle's appearance, a vehicle license plate, a human body, a human face, etc. Although the predetermined object is assumed to be a moving object, the predetermined object may be a still object. When halation is caused in image data of an image captured by the image capture apparatus 100, e.g. due to the headlights of a vehicle, the visibility of the predetermined object is reduced. The image capture apparatus 100 according to the second embodiment performs control for detecting the predetermined object included in the image data, and causing the area of the predetermined object to be displayed in an emphasized manner. This improves user-friendliness.

Figure 12:
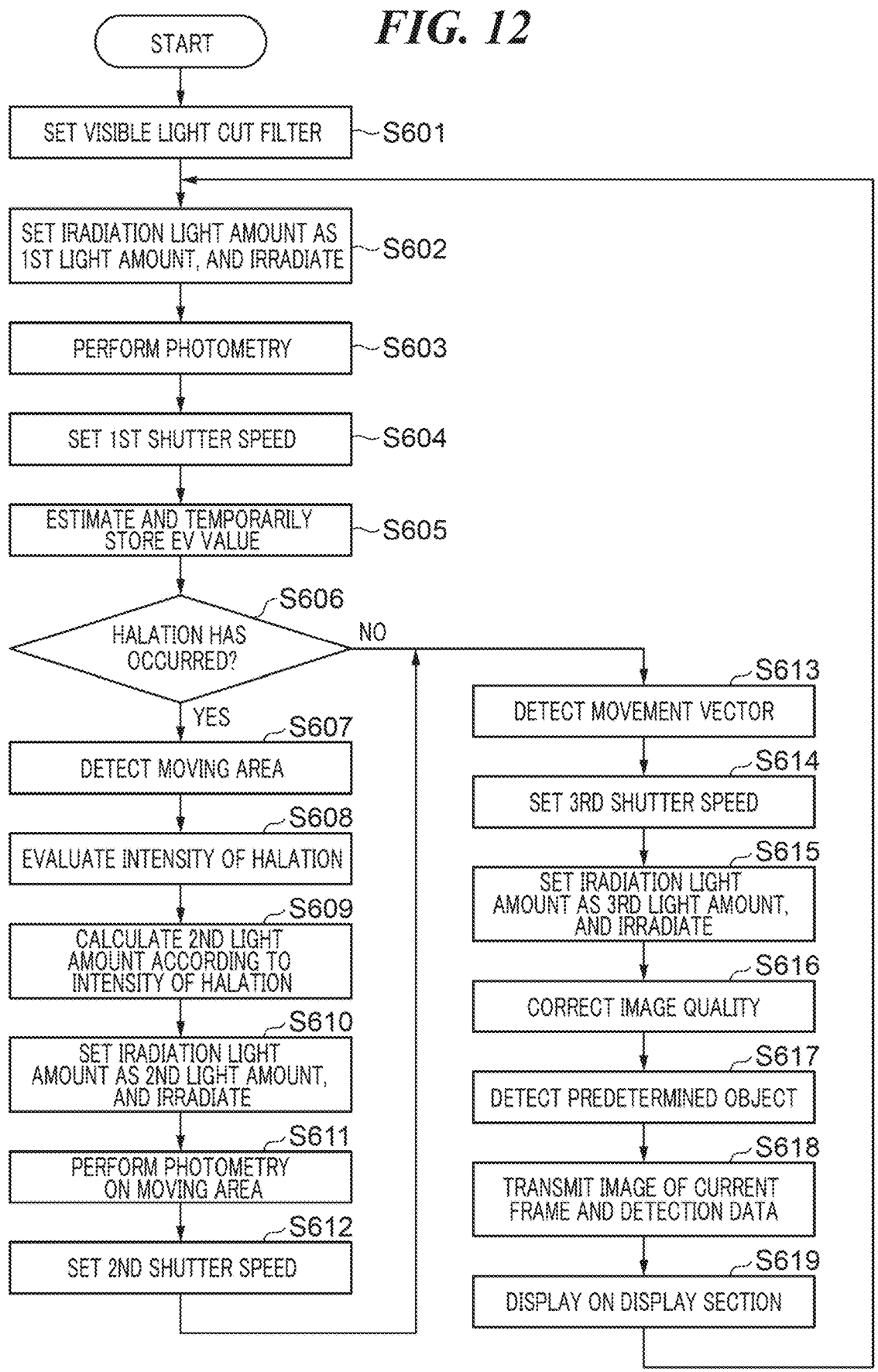
FIG. 12 is a flowchart of a process performed in a fourth embodiment of the present invention.

FIG. 12 is a flowchart of a process performed in the fourth embodiment. Since steps S601 to S612 are the same as the steps S301 to S312 in the third embodiment, description thereof is omitted. The controller 104 refers to the immediately preceding image data (immediately preceding frame) temporarily stored in the auxiliary storage device 102. Then, the controller 104 detects a movement vector by comparing the immediately preceding frame and the current frame (acquired image data) which are different in time (S613). A desired method can be applied to a movement vector detection method. As the movement vector detection method, for example, the optical flow method or the block matching method can be applied. In a case where these movement vector detection methods are applied, the controller 104 divides the image data items into small areas, searches for small areas having the same pixel values between the image data items, and associates the small areas with each other, to thereby detect a distance and a direction between the small areas.

The controller 104 assumes a magnitude of the movement vector obtained in the step S613 as an amount of blur caused by capturing an image of the moving object, and derives a third shutter speed for suppressing movement blur according to the magnitude of the movement vector. Then, the controller 104 sets the derived third shutter speed (S614). The third shutter speed can be derived from the following equation (3):

$$S_3 = \frac{f_r}{|v|} n \qquad (3)$$

In the above equation (3), "$S_3$" represents the third shutter speed, "$f_r$" represents a frame rate used in deriving the third shutter speed, and "$v$" represents the detected movement vector. Further, "$n$" represents an allowable parameter.

The controller 104 derives an irradiation light amount (third light amount) of the illumination section 103 with respect to the exposure amount changed due to controlling the shutter speed in the step S614. Due to setting the shutter speed to the third shutter speed in the step S614, the exposure amount is reduced. The third light amount is a light amount at which the correct exposure of the moving area is achieved again. Then, the controller 104 performs control for setting the derived third light amount as the irradiation light amount of the illumination section 103 and causing the third light amount of infrared light to be irradiated from the illumination section 103 (S615). The third light amount is derived by the following equation (4):

$$l_3 = m_{hal}\{1-\exp(-r|d_{ev}|)\}(l_{max}-l_{pre})+l_{pre} \quad (4)$$

In the above equation (4), "$l_3$" represents a third irradiation light amount for achieving the correct exposure of the moving object which has been darkened due to the increased shutter speed. "$m_{hal}$" represents a mask parameter indicative of a result of the determination of halation, and takes a value of 0 or 1. "r" represents an adjustment parameter set by taking a reflectance of the object into account and takes a value equal to or larger than 0. "$d_{ev}$" represents a difference in exposure amount caused by a change in the exposure amount. "$l_{pre}$" represents the immediately preceding light amount. The allowable parameter "n" may be a value properly set according to a scene to be shot, or it may be a preset value set independently of the scene. "$l_{pre}$" represents the second light amount if halation has occurred in image data, and represents the first light amount if halation has not occurred in image data.

The controller 104 performs proper image quality correction of the image data for further enhancing the detection accuracy of the predetermined object (S616). The controller 104 detects the predetermined object from the image data having been subjected to the image quality correction in the step S616 (S617). The controller 104 performs control for adding detection data to the current image data and transmitting the image data with the detection data from the auxiliary storage device 102 to the display section 106 via the data communication section 105 (S618). The detection data (hereinafter referred to as the "label data") indicates an image capture area of a target to be detected and what the target to be detected is (type of the target to be detected). For example, when the object to be detected is a vehicle license plate, a label data indicative of the vehicle license plate is added to the image data as detection data. When the display section 106 displays the image data, the controller 104 performs control for causing the display section 106 to display not only a frame of the image capture area of the target to be detected but also the label data. With this control, the frame is displayed in an area of the predetermined object, which is the target to be detected from the image, whereby the detected predetermined object is displayed on the display section 106 with emphasis. Further, the data indicating what the detected predetermined object is displayed on the display section 106. This makes it possible for the user to more excellently view the object of the image data.

Figure 13:
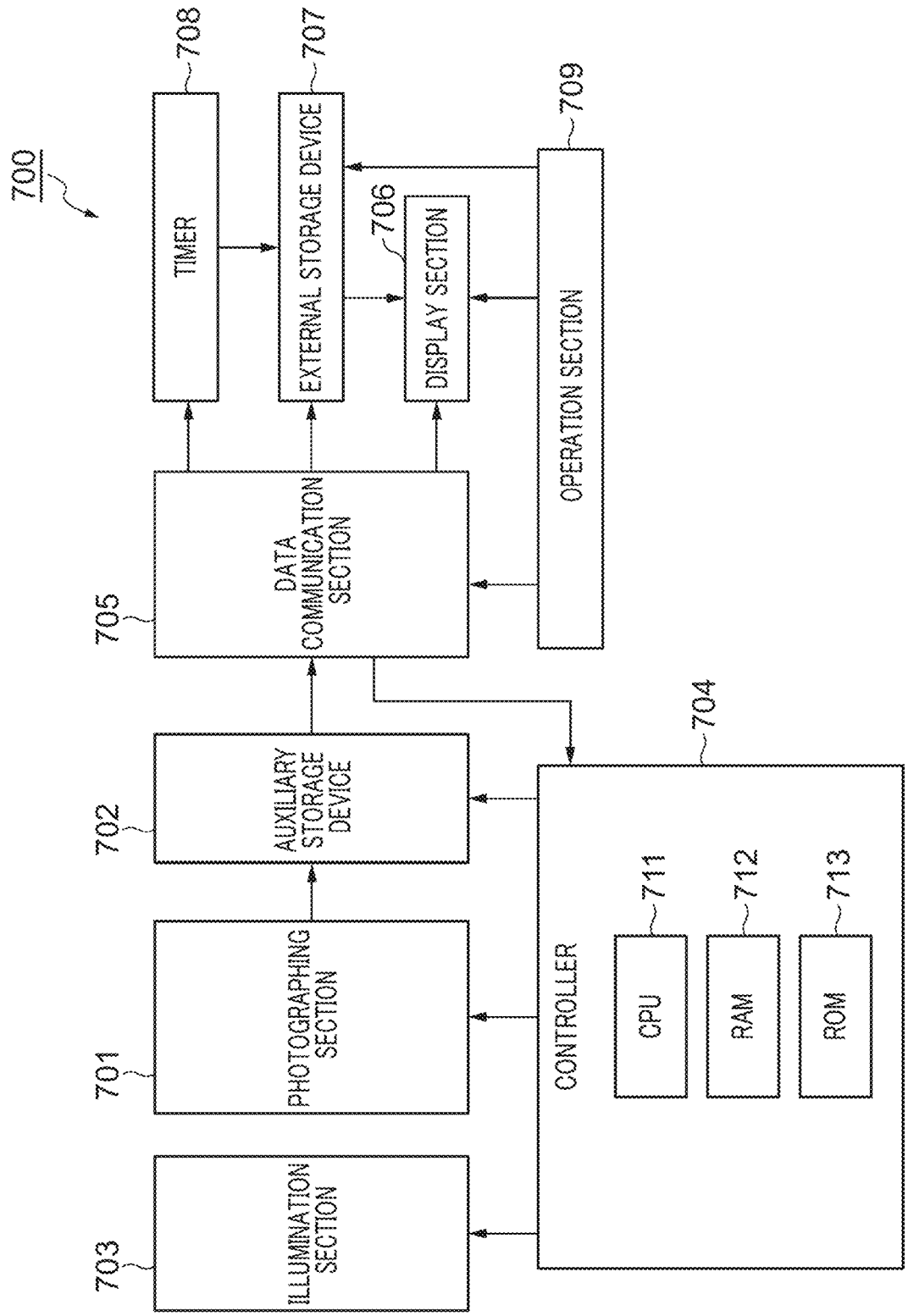
FIG. 13 is a block diagram of an image capture apparatus according to a fifth embodiment of the present invention.

Next, a description will be given of the fifth embodiment of the invention. FIG. 13 is a block diagram of an image capture apparatus 700 according to the fifth embodiment. The image capture apparatus 700 in FIG. 13 is different from the image capture apparatus 100 in FIG. 7 in that the image capture apparatus 700 further includes an external storage device 707, a timer 708, and an operation section 709. The other components of the image capture apparatus 700 are configured similar to those of the image capture apparatus 100 in FIG. 7, and hence description thereof is omitted. A controller 704 has a function of detecting the predetermined object, which is described in the fourth embodiment. Further, the controller 704 causes the external storage device 707 to store not only label data indicating what a detected object is but also time information indicating a time point of detection of the object in association with the label data.

For example, in a case where the image capture apparatus 700 is applied to public road surveillance, image data obtained by the image capture apparatus 700 can be used e.g. for inspection as well. In this case, the image capture apparatus 700 performs control for causing image data obtained by capturing an object to be stored in the external storage device 707. Since this makes it possible not only to search for the image data from the external storage device 707 but also to analyze the image data, user-friendliness is improved. Here, when analysis of the image data stored in the external storage device 707 is performed, there is a case where all the image data stored in the external storage device 707 is not necessarily required to be used. Data required for the analysis of the image data sometimes includes image data showing a detected object, label data of the detected object, information of time at which the image data is detected, and so forth.

Therefore, when an object is detected in the step S617 in FIG. 12, the controller 704 accesses the timer 708 via a data communication section 705. Current time information is obtained from the timer 708. The controller 704 causes the current time (time point at which an image of the object was captured) acquired from the timer 708 to be stored in the external storage device 707 in association with the image data obtained by image capture and the label data. With this, the image data, the label data, and the time information are stored in the external storage device 707 in association with each other. The image capture apparatus 700 includes the operation section 709. When the user searches for the image data from image data items stored in the external storage device 707 by operating the operation section 709, the user can perform the search by designating the time information. This makes it possible for the user to easily search for desired image data.

The image data (image data on the predetermined object) found by the search is displayed on a display section 706. Further, by operating the operation section 709, the user can transmit a command to the data communication section 705. The data communication section 705 inputs the received command to the controller 704. Since this makes it possible to sequentially control a photographing section 701 and an illumination section 703, the user can perform image capture under more appropriate conditions. Although in the fifth embodiment, the description is given of the example in which the image data, the label data, and the time information are stored in the external storage device 707 in association with each other, the image data and the time information may be stored in the external storage device 707 in association with each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-238628, filed Dec. 20, 2018, and No. 2018-238629, filed Dec. 20, 2018 which are hereby incorporated by reference herein in their entirety.

What is claimed is:

1. An electronic apparatus including at least one processor or circuit configured to perform the operations of the following units:
   an evaluation unit configured to evaluate a luminance of an object based on an exposure level at which image information of the object is acquired; and
   a detection unit configured to detect halation based on the luminance of the object, a first luminance area having a higher luminance than a first luminance threshold value, and a distribution status of another luminance area which is an area having a lower luminance than the first luminance area and is distributed around the first luminance area.

2. The electronic apparatus according to claim 1, wherein the at least one processor or circuit is configured to further perform the operations of:
   a classification unit configured to classify luminance areas including the first luminance area and the other luminance area, using at least one luminance threshold value; and
   a change unit configured to change the at least one luminance threshold value according to the luminance of the object.

3. The electronic apparatus according to claim 2, wherein in a case where the luminance of the object is equal to or higher than a predetermined luminance value, the change unit is further configured to increase the at least one luminance threshold value.

4. The electronic apparatus according to claim 1, wherein in a case where the detection unit detects the first luminance area and the another luminance area whose luminance becomes lower in an outer peripheral direction from the first luminance area, the detection unit is further configured to detect the halation.

5. The electronic apparatus according to claim 1,
   wherein the at least one processor or circuit is configured to further perform the operation of an exposure control unit configured to control an exposure level of an image sensor, and
   wherein the evaluation unit is further configured to evaluate the luminance of the object and a luminance of ambient light based on the exposure level controlled by the exposure control unit.

6. The electronic apparatus according to claim 5, wherein in a case where a luminance ratio between the luminance of the ambient light and the luminance of the object is equal to or smaller than a predetermined value, the detection unit is further configured to detect the halation based also on a distribution status of a third luminance area which is distributed around the second luminance area.

7. The electronic apparatus according to claim 1, wherein the detection unit is further configured to detect the halation with respect to a moving one of objects in the image information, but not detect the halation from a non-moving one of the objects.

8. The electronic apparatus according to claim 1, wherein the electronic apparatus is an image capture apparatus including an image capture device.

9. A control apparatus that performs communication with an electronic apparatus, the electronic apparatus comprising at least one processor or circuit configured to perform the operations of the following units:
   an evaluation unit configured to evaluate a luminance of an object based on an exposure level at which image information of the object is acquired; and
   a detection unit configured to detect halation based on the luminance of the object, a first luminance area having a higher luminance than a first luminance threshold value, and a distribution status of another luminance area which is an area having a lower luminance than the first luminance area and is distributed around the first luminance area, and
   the control apparatus comprising at least one another processor or another circuit configured to perform the operations of the following units:
   an acquisition unit configured to acquire image information from the electronic apparatus in a case where the electronic apparatus detects halation; and
   a control unit configured to control an irradiation apparatus to increase the amount of light irradiated by the irradiation apparatus based on luminance information of the image information acquired by the acquisition unit.

10. An image capture apparatus including:
   a control apparatus;
   at least one processor or circuit configured to perform the operations of the following units:
     an evaluation unit configured to evaluate a luminance of an object based on an exposure level at which image information of the object is acquired; and
     a detection unit configured to detect halation based on the luminance of the object, a first luminance area having a higher luminance than a first luminance threshold value, and a distribution status of another luminance area which is an area having a lower luminance than the first luminance area and is distributed around the first luminance area; and
   an image capture device that receives incident light containing infrared wavelength light,
   wherein the control apparatus comprises at least one another processor or another circuit configured to perform the operations of the following units:
     an acquisition unit configured to acquire image information from the electronic apparatus in a case where the electronic apparatus detects halation; and a control unit configured to control an irradiation apparatus to increase the amount of light irradiated by the irradiation apparatus based on luminance information of the image information acquired by the acquisition unit.

11. The image capture apparatus according to claim 10, wherein the incident light is light of which visible light is cut by a visible light cut filter.

12. The image capture apparatus according to claim 10, wherein the control unit is further configured to detect a case where a first luminance area having a higher luminance than a first luminance threshold value exists in the image information, and also a second luminance area having a higher luminance than a second luminance threshold value lower than the first luminance threshold value exists around the first luminance area, as a state where the halation has occurred.

13. The image capture apparatus according to claim 12, wherein the second luminance threshold value is a threshold value for determining a luminance area associated with charge leakage caused by halation.

14. The image capture apparatus according to claim 10, wherein the control unit is further configured to perform control for detecting a moving area based on the image information, and performing photometry on the detected moving area.

15. The image capture apparatus according to claim 14, wherein when the halation has been detected, the control unit is further configured to perform control for setting a second shutter speed such that exposure is adjusted to the moving area.

16. The image capture apparatus according to claim 10, wherein the control unit is further configured to perform processing for changing a γ curve according to a state of a luminance histogram or processing for changing saturation according to a value as an index of brightness, on the image information acquired when the irradiation light amount of light irradiated by the irradiation apparatus was increased.

17. The image capture apparatus according to claim 15, wherein the control unit is further configured to detect a movement vector based on the image information, changes the second shutter speed to a third shutter speed according to a magnitude of the detected movement vector, and control the irradiation light amount of light irradiated by the irradiation apparatus such that the exposure is adjusted to the moving area.

18. The image capture apparatus according to claim 10, wherein the control unit is further configured to detect a predetermined object from the image information, and perform emphasis processing on the detected predetermined object.

19. The image capture apparatus according to claim 18, wherein the control unit is further configured to perform processing for causing a frame to be displayed on an area of the predetermined object as the emphasis processing.

20. The image capture apparatus according to claim 18, wherein the control unit is further configured to perform control for adding detection information indicative of a type of the detected predetermined object to the image information, and causing the detection information to be displayed together with image information.

21. The image capture apparatus according to claim 18, wherein the control unit is further configured to perform control for causing time information indicative of a time point at which the predetermined object was detected to be stored in a storage unit in association with the image information.

22. A method of controlling an electronic apparatus, comprising:
evaluating a luminance of an object based on an exposure level at which image information of the object is acquired; and
detecting halation based on the luminance of the object, a first luminance area having a higher luminance than a first luminance threshold value, and a distribution status of another luminance area which is an area having a lower luminance than the first luminance area and is distributed around the first luminance area.

23. A method of controlling a control apparatus and an electronic apparatus, the control apparatus and the electronic apparatus communicating with each other, the method comprising:
causing the electronic apparatus to:
evaluate a luminance of an object based on an exposure level at which image information of the object is acquired; and
detect halation based on the luminance of the object, a first luminance area having a higher luminance than a first luminance threshold value, and a distribution status of another luminance area which is an area having a lower luminance than the first luminance area and is distributed around the first luminance area; and
causing the control apparatus to:
acquire image information from the electronic apparatus in a case where the electronic apparatus detects halation; and
control an irradiation apparatus to increase the amount of light irradiated by the irradiation apparatus based on luminance information of the acquired image information.

24. A non-transitory computer-readable storage medium storing a computer-executable program for executing a method of controlling an electronic apparatus, wherein the method comprises:
evaluating a luminance of an object based on an exposure level at which image information of the object is acquired; and
detecting halation based on the luminance of the object, a first luminance area having a higher luminance than a first luminance threshold value, and a distribution status of another luminance area which is an area having a lower luminance than the first luminance area and is distributed around the first luminance area.

25. A non-transitory computer-readable storage medium storing a computer-executable program for executing a method of controlling a control apparatus and an electronic apparatus, the control apparatus and the electronic apparatus communicating with each other, wherein the method comprises:
causing the electronic apparatus to:
evaluate a luminance of an object based on an exposure level at which image information of the object is acquired; and
detect halation based on the luminance of the object, a first luminance area having a higher luminance than a first luminance threshold value, and a distribution status of another luminance area which is an area having a lower luminance than the first luminance area and is distributed around the first luminance area; and
causing the control apparatus to:

acquire image information from the electronic apparatus in a case where the electronic apparatus detects halation; and control an irradiation apparatus to increase the amount of light irradiated by the irradiation apparatus based on luminance information of the acquired image information.

\* \* \* \* \*